United States Patent [19]

Kiyohara et al.

[11] 4,307,408

[45] Dec. 22, 1981

[54] RECORDING APPARATUS USING COHERENT LIGHT

[75] Inventors: Takehiko Kiyohara, Zama; Kazuo Hoshito, Kawasaki; Seishiro Yoshioka, Tokyo; Masanao Kasai, Tabata; Naoto Kawamura, Inagi; Hiroshi Hanada, Yokohama, all of Japan

[73] Assignee: Canon Kabushiki Kaisha, Tokyo, Japan

[21] Appl. No.: 20,470

[22] Filed: Mar. 14, 1979

Related U.S. Application Data

[63] Continuation of Ser. No. 790,410, Apr. 25, 1977, abandoned.

[30] Foreign Application Priority Data

| Apr. 28, 1976 | [JP] | Japan | 51-49228 |
| Apr. 28, 1976 | [JP] | Japan | 51-49229 |
| Apr. 28, 1976 | [JP] | Japan | 51-49230 |
| Apr. 28, 1976 | [JP] | Japan | 51-49232 |
| Apr. 28, 1976 | [JP] | Japan | 51-49233 |

[51] Int. Cl.³ ............................................. G01D 15/14
[52] U.S. Cl. ................................... 346/76 L; 346/108
[58] Field of Search ................ 346/108, 76 L; 354/5, 354/7; 358/297, 132, 206; 350/6.8, 6.7, 6.6

[56] References Cited

U.S. PATENT DOCUMENTS

| 3,154,371 | 10/1964 | Johnson | 346/108 |
| 3,314,073 | 4/1967 | Becker | 346/76 L |
| 3,341,853 | 9/1967 | Hadley | 346/110 R X |
| 3,448,458 | 6/1969 | Carlson | 346/76 L X |
| 3,626,141 | 12/1971 | Daly | 219/121 L |
| 3,751,587 | 8/1973 | Insler | 346/76 L X |
| 3,809,806 | 5/1974 | Walker | 346/108 X |
| 4,028,732 | 6/1977 | Salter | 346/76 L X |
| 4,044,363 | 8/1977 | Morgan | 346/108 X |
| 4,054,928 | 10/1977 | Butler | 358/296 X |
| 4,125,842 | 11/1978 | Ohnishi | 346/76 L X |

*Primary Examiner*—Joseph W. Hartary
*Attorney, Agent, or Firm*—Fitzpatrick, Cella, Harper & Scinto

[57] ABSTRACT

This specification discloses a recording apparatus using coherent light which comprises coherent light generating means for generating coherent light, light modulating means into which the coherent light from the coherent light generating means enters, whereby when in ON state, the light modulating means emits the entering coherent light outwardly as zero-order light having a certain angle of emergence and when in OFF state, the light modulating means derives the entering coherent light as a primary light having another angle of emergence, the primary light being intercepted by an intercepting member so as not to be emitted outwardly, means for applying modulating signal to the light modulating means for controlling ON-OFF of the light modulating means, deflector means for deflecting the zero-order light emitted from the light modulating means, and a recording medium upon which the deflected zero-order light is thrown and which is sensitized by the zero-order light from the light modulating means when in ON state and which is not sensitized by the zero-order light leaking from the light modulating means when in OFF state.

14 Claims, 24 Drawing Figures

FIG. 5
(a)
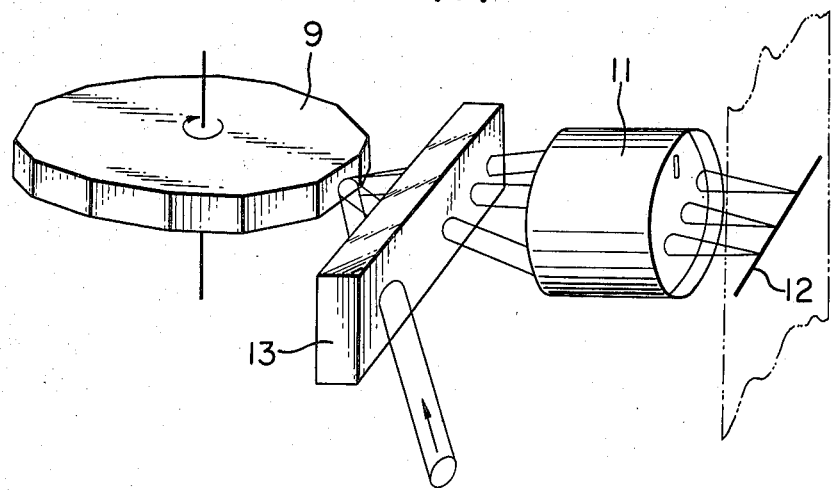
(b)
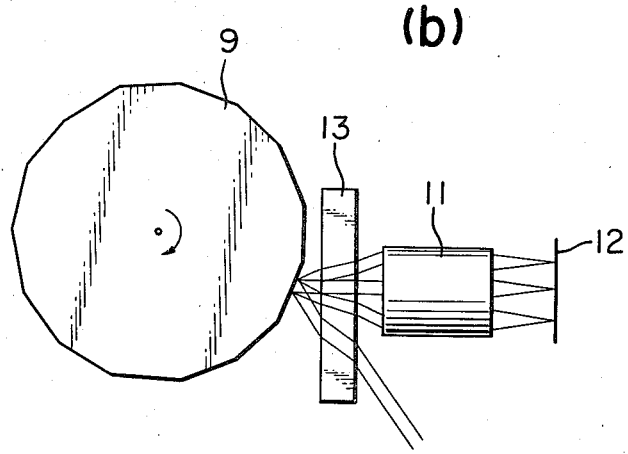
FIG. 6
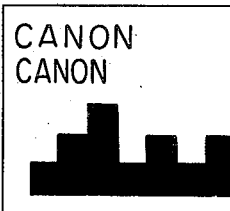
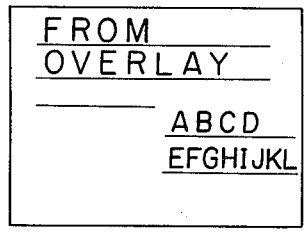

POSITIVE TRUE

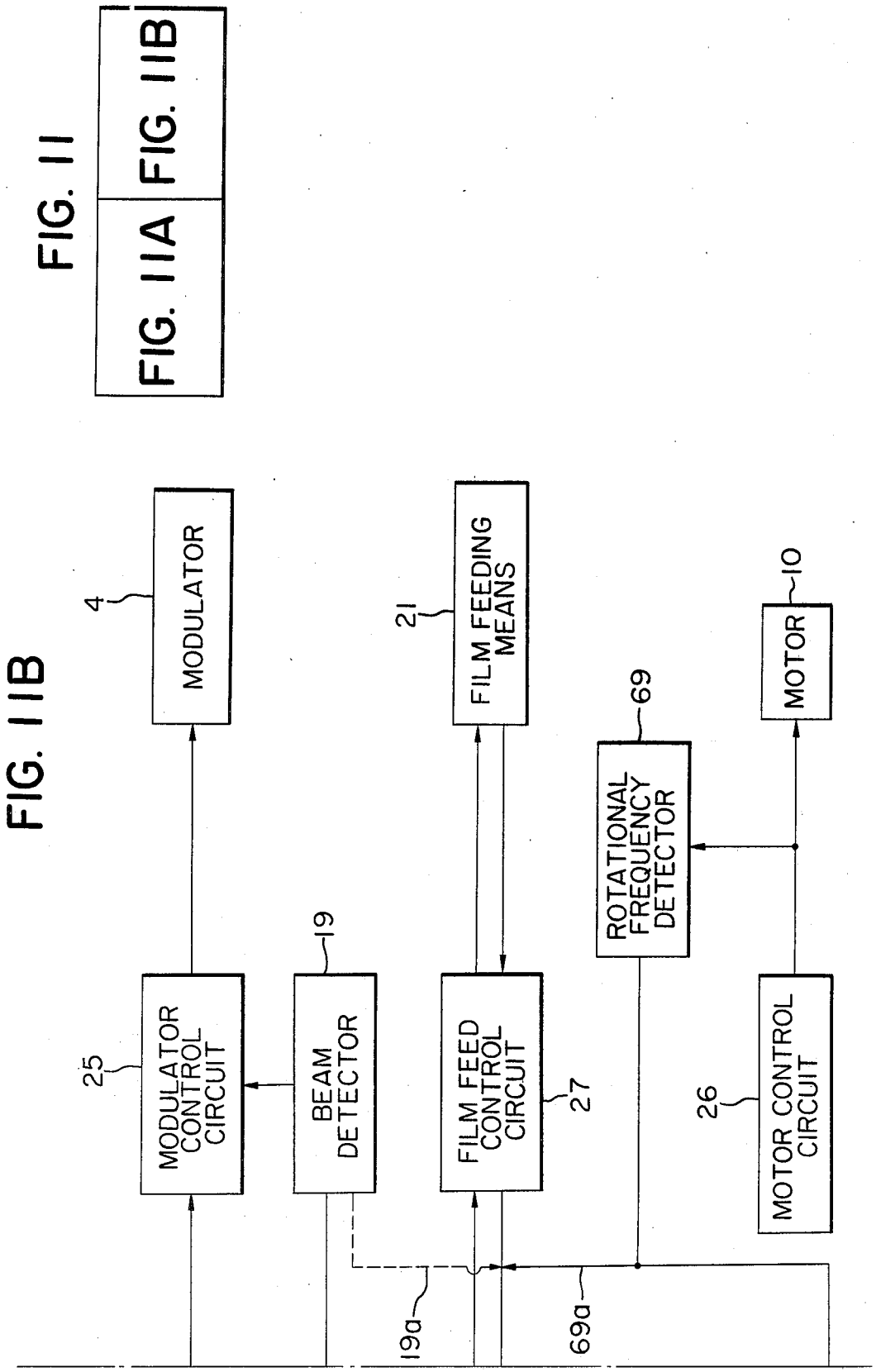

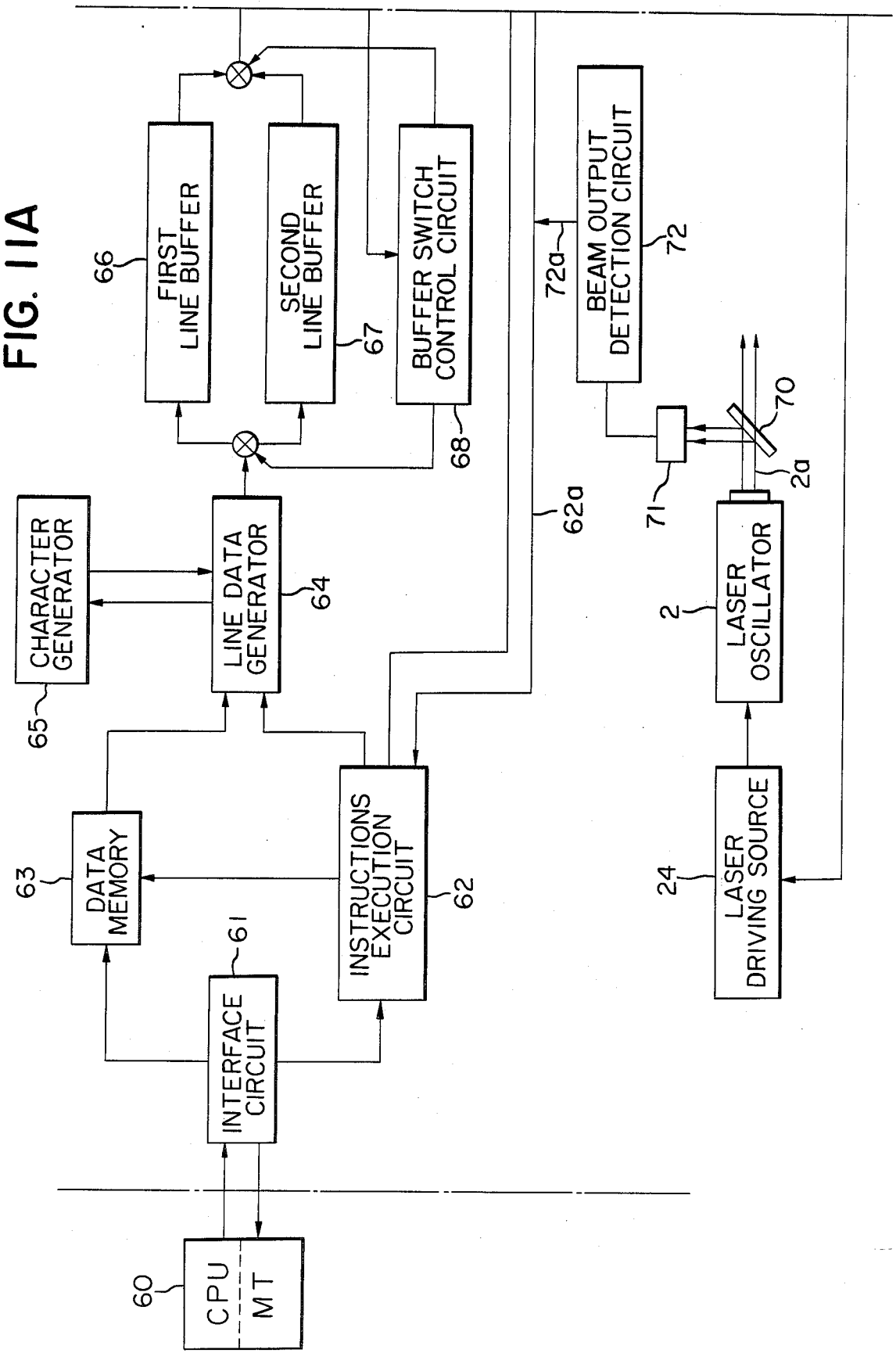
FIG. IIA

FIG. 15
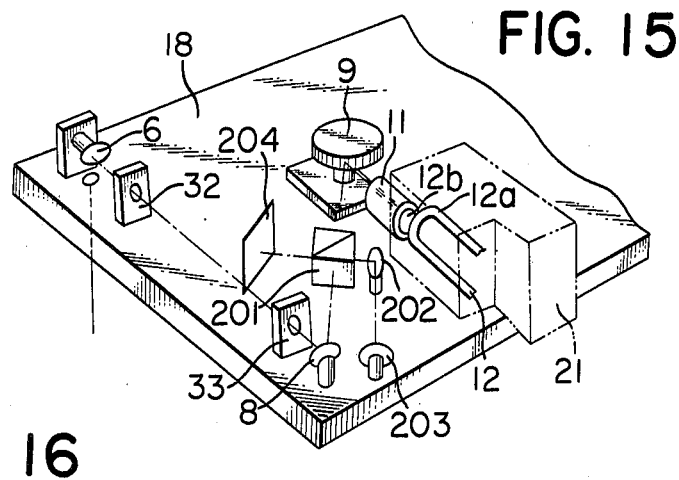
FIG. 16
(A)
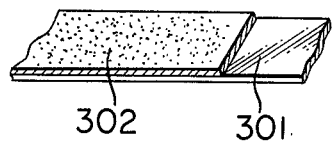
(B)
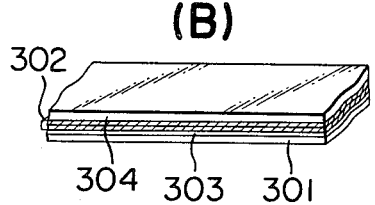
FIG. 17
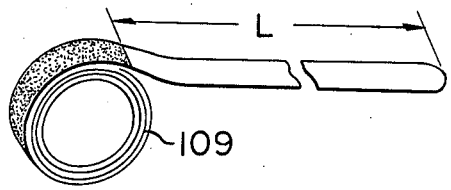
FIG. 20
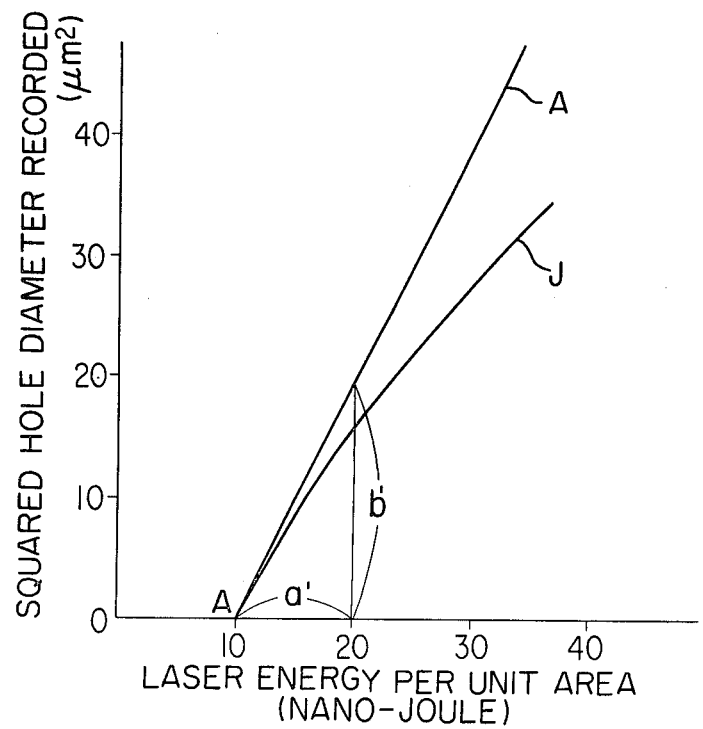

FIG. 19

| | | P | G1 | G2 | G3 | G4 | S1 | S2 | S3 | S4 | S5 | S6 | S7 | S8 | S9 | M1 | M2 | M3 | Q1 | Q2 |
|---|---|---|---|---|---|---|---|---|---|---|---|---|---|---|---|---|---|---|---|---|
| 1 | FILM LOADING (AUTOMATIC) | O | – | – | – | – | – | – | – | – | – | O | O | O | O | – | – | – | O | O |
| 2 | REGISTRATION (AUTOMATIC STOP) | – | O | – | O | O | O | O | O | O | O | – | O | O | O | – | – | – | O | – |
| 3 | WRITE IN — START | O | – | O or – | O or – | O or – | O or – | O or – | O or – | O | – | O | O | O | O | – | – | – | – | – |
| 4 | WRITE IN — STOP | O | – | O or – | O or – | O or – | O or – | O or – | O or – | O | O | – | O | O | O | – | – | – | O | – |
| 5 | MANUAL STOP | O or – | O | O or – | O or – | O or – | O | O | O | – | O | – | O | O | O | – | – | – | O | O |
| 6 | MANUAL FAST FORWARDING | O or – | O | O or – | O or – | O or – | – | – | – | – | – | O | O | – | O | – | – | – | O | O |
| 7 | MANUAL REWINDING | O or – | O | O or – | O or – | O or – | – | – | – | – | – | O | O | O | – | – | –1 | –1 | O | O |

RECORDING APPARATUS USING COHERENT LIGHT

This is a continuation of application Ser. No. 790,410 filed Apr. 25, 1977, now abandoned.

BACKGROUND OF THE INVENTION

1. Field of the Invention

This invention relates to a recording apparatus in which a light beam modulated by modulation signal is thrown upon a recording medium to thereby effect recording thereon.

2. Description of the Prior Art

If such an arrangement is made that coherent light provided from a laser oscillator or the like is applied to an ultrasonic wave modulator and a primary light resulting from the application of ultrasonic signal to the ultrasonic wave modulator emerges outwardly but a zero-order light resulting when the ultrasonic signal is not applied to the ultrasonic wave modulator does not emerge outwardly and that the primary light emergent from such modulator is thrown upon a recording medium, then it is possible to record information on the recording medium by controlling the ultrasonic wave modulator by recording signals.

If primary light is so used for the recording, the ratio of the quantity of light thrown upon the recording medium during the application of ultrasonic signal to the ultrasonic wave modulator to the quantity of light thrown upon the recording medium during non-application of ultrasonic signal to the ultrasonic wave modulator (the extinction ratio) may be secured at a great value (easily at a value above 50) and therefore, this is suitable for a medium such as silver salt film having a low $\gamma$ value to be used as the recording medium.

However, the primary light obtained is only 60 to 70% of the input light to the ultrasonic wave modulator and this means a great loss of energy. Accordingly, it becomes necessary to provide a laser beam generator having a great output or to slow down the speed at which information is written in the recording medium.

The angle of separation $\theta$ between the zero-order light and the primary light from the ultrasonic wave modulator depends on the ultrasonic frequency and further on the laser wavelength. Therefore, where the laser in use is an argon ion laser, if multimode oscillation is effected, laser oscillations of eight different wavelengths occur simultaneously between 4579 Å and 5145 Å as the main oscillation wavelength. If such laser light is passed through an ultrasonic wave modulator, the primary diffracted light emergent therefrom is directed in eight different directions in accordance with the respective wavelength. Thus, where such primary diffracted light emergent in eight different directions is utilized as light energy in ON state, and if it is condensed by a condenser lens, the spot diameter of the beam becomes more enlarged than the spot diameter of a single wavelength. This means a poorer resolving power of the recording.

SUMMARY OF THE INVENTION

It is therefore an object of the present invention to present a recording apparatus using coherent light which is capable of effecting recording on a recording medium by the use of a smaller coherent light generator.

It is another object of the present invention to present a recording apparatus which is capable of effecting recording on a recording medium at a higher speed.

It is still another object of the present invention to present a recording apparatus which is capable of effecting recording on a recording medium with a high resolving power.

To achieve these objects, the recording apparatus using coherent light according to the present invention comprises coherent light generating means for generating coherent light, light modulating means into which the coherent light from the coherent light generating means enters, whereby when in ON state, the light modulating means emits the entering coherent light outwardly as zero-order light having a certain angle of emergence and when in OFF state, the light modulating means derives the entering coherent light as a primary light having another angle of emergence, the primary light being intercepted by an intercepting member so as not to be emitted outwardly, means for applying modulation signal to the light modulating means for controlling ON-OFF of the light modulating means, deflector means for deflecting the zero-order light emitted from the light modulating means, and a recording medium upon which the deflected zero-order light is thrown and which is sensitized by the zero-order light from the light modulating means when in ON state and which is not sensitized by the zero-order light leaking from the light modulating means when in OFF state.

Other objects and effects of the present invention will become fully apparent from the following detailed description of the invention taken in conjunction with the accompanying drawings.

BRIEF DESCRIPTION OF THE DRAWINGS

FIGS. 5A and B illustrate the deflection of the laser beam.

FIG. 6 is a front view showing a pattern recorded on a recording medium.

FIG. 11 is a block diagram of the laser recording apparatus according to the present invention.

FIG. 15 is a perspective view illustrating the adjustment of the optic axis of the laser recording apparatus shown in FIG. 1.

FIGS. 16A and B and FIG. 17 are perspective views showing the recording medium.

FIG. 19 is a chart of signalling for illustrating the operation of the laser device shown in FIG. 18.

FIG. 20 is a graph for illustrating the gamma characteristic.

DESCRIPTION OF THE PREFERRED EMBODIMENTS

The invention will hereinafter be described with respect to an embodiment thereof which is a recording apparatus in which a laser beam modulated by information is thrown upon a film to thereby effect recording on the film.

Figure 1:
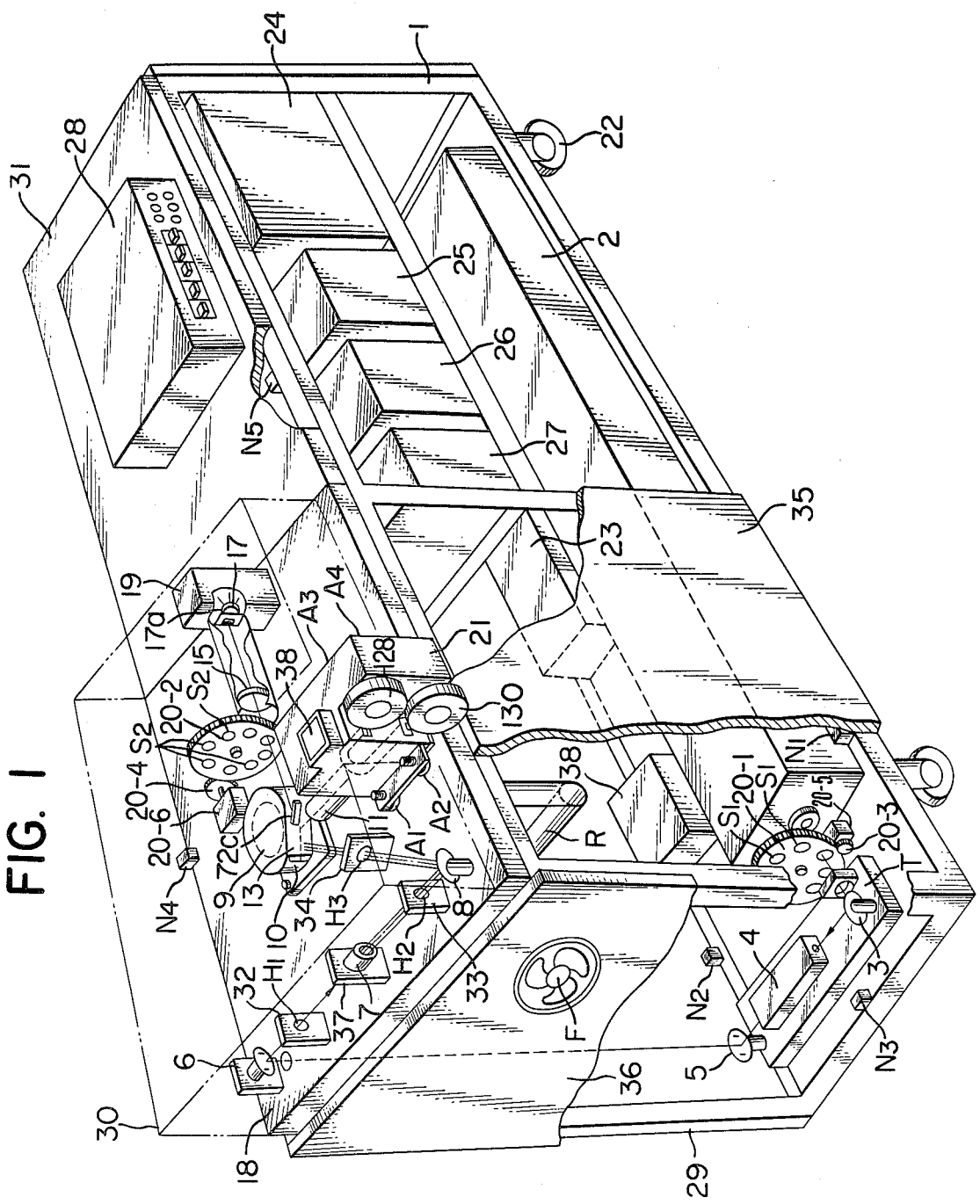
FIG. 1 is a perspective view of the laser recording apparatus according to the present invention.
Figure 2:
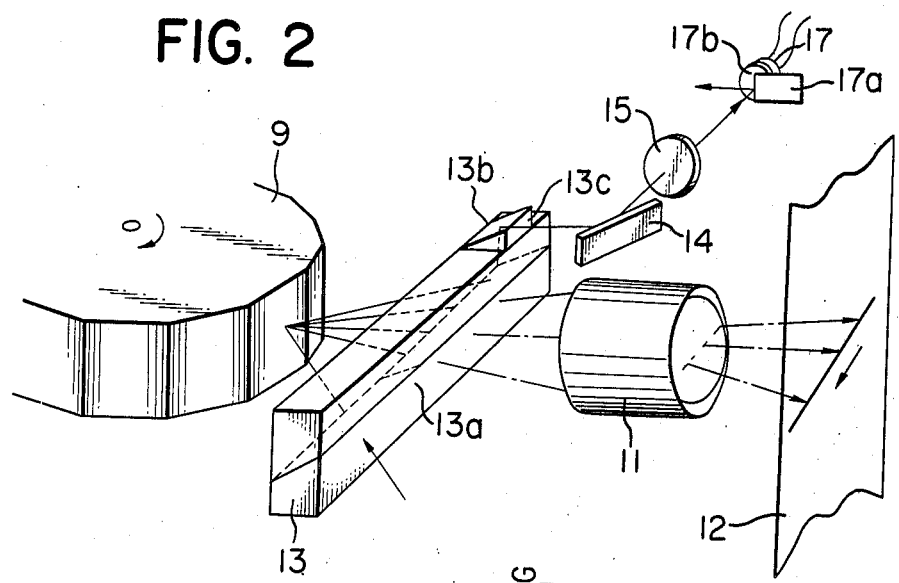
FIG. 2 is an enlarged perspective view of portions of the apparatus adjacent to a polygonal mirror shown in FIG. 1.

In FIGS. 1 and 2, the laser beam oscillated from a laser oscillator 2 mounted on a frame 1 is passed through a beam intensity regulating device S3 and a shutter T and directed through a first reflecting optical system 3 to the input opening of a modulator 4.

Figure 3:
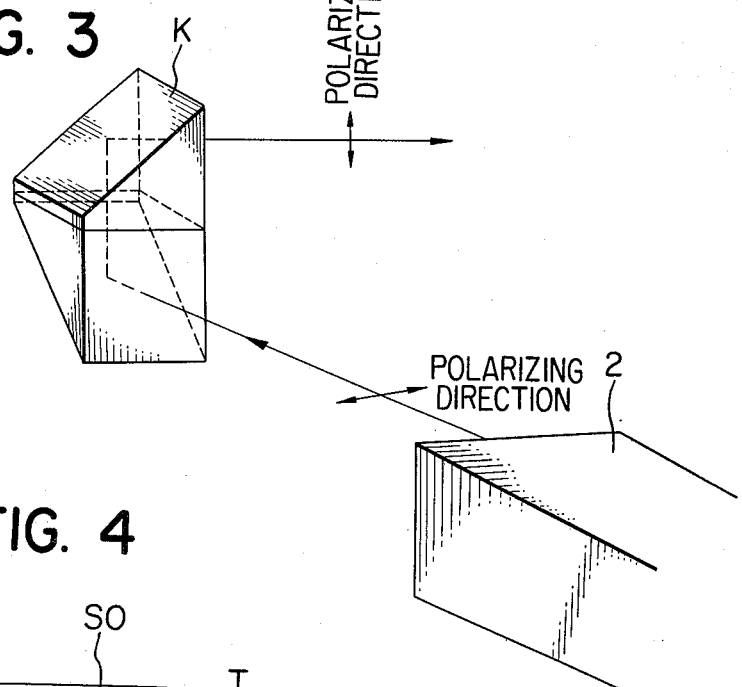
FIG. 3 is a perspective view showing a deflecting prism.

The first reflecting optical system 3 is inserted to bend the optical path horizontally to reduce the space occupied by the apparatus and also to align the optic axis of the laser beam with the input opening of the modulator 4 and in addition, as will be later described in connection with FIG. 3, the first reflecting optical system may have the function of rotating the polarizing direction of the laser beam. The beam intensity regulating device S3 and the shutter T may be eliminated if not required. The modulator 4 may be either well-known acousto-optic modulation element utilizing the acousto-optic effect or a well-known electro-optic element utilizing the electro-optic effect. In the modulator 4, the laser beam is subjected to strong or weak intensity modulation in accordance with the extraneous input signal to the modulator 4. The laser beam emergent from the modulator 4 is vertically deflected by a second reflecting optical system 5 and then horizontally deflected by a third reflecting optical system 6, whereafter it is directed to a beam expander optical system 7.

The reflecting optical systems 5 and 6 have their reflecting surfaces rotatable and therefore, in whatever direction the emergent beam from the modulator 4 is directed, the laser beam can be made to impinge perpendicularly to the optic axis of the beam expander optical system 7 by adjusting the angles of the reflecting surfaces of these two reflecting optical systems. The laser beam has its beam diameter enlarged by the beam expander optical system 7 while it remains a parallel beam. The laser beam having its beam diameter so enlarged passes through a fourth reflecting optical system 8 and further through a window 13 to a rotatable mirror 9 having one or more mirrored surfaces (in the shown embodiment, it is a mirror having sixteen reflecting surfaces). The rotatable mirror 9 is mounted on a shaft supported by high-precision bearing (for example, a pneumatic bearing) and driven from a constant-speed motor (such as a hysteresis synchronous motor or DC servomotor). The laser beam may be horizontally swept by such rotatable mirror 9.

The laser beam emergent from the rotatable mirror 9 re-enters the window 13 which forms part of the cover of the rotatable mirror 9. As shown in FIG. 2, the window 13 partly comprises a half-mirror 13a so that the laser beam is divided into transmitted light and reflected light. The transmitted laser beam is focused as a spot on a recording medium 12 by a focusing lens 11.

The focusing lens is formed substantially without aberration and its performance is determined only by the influence of diffraction. The image height y of the focusing lens is expressed as:

$$y = f \cdot \theta,$$

where $\theta$ is the angle of incidence of the incident light upon the focusing lens and f the focal length of the lens. Thus, if the incidence angle and the image height are proportional to each other and the laser beam is caused to be incident on the focusing lens with the angle of incidence of the laser beam upon the focusing lens being equiangularly deflected by the rotatable mirror 9, the beam spot focused on the surface of the recording medium will move rectilinearly at an equal velocity so that the data carried on the laser beam at equal time intervals will be recorded at equal space intervals.

The laser beam reflected by the half-mirror 13a of the window 13 is reflected by a reflecting surface of a prism 13b attached to the upper surface of the window 13 for causing the laser beam emergent therefrom before impinging upon the recording medium during one scan of the beam to be reflected as a synchronizing light beam, whereby the reflected laser beam emerges outwardly from the window 13. This emergent beam is reflected by a mirror 14 and passed through the beam intensity regulating device 54, whereafter it is focused on the surface of a beam detecting element 17 provided with a knife edge 17a, by the focusing lens 15. The beam detecting element 17 comprises a quickly responsive photoelectric conversion element (such as PIN diode) which may detect the position of the laser beam swept, and the detection signal thereof is used to determine the start timing for the input signal to the modulator 4 for imparting desired light information onto the recording medium 12.

The laser beam modulated in accordance with the input signal and deflected by the rotatable mirror 9, in the manner described above, is projected upon the recording medium 12 moving at a uniform velocity, as the auxiliary scanning, and the image formed on the recording medium 12 is immediately visualized and fixed by a dry treating process using heat.

The optical elements of the foregoing apparatus and the synchronizing system will now be described in further detail by reference to FIGS. 1, 2, 3, 4 and 5.

As the light source, use is made of, for example, monochromatic light of wavelength 488 mm from an Ar laser. The mode used in TEMOO and utilizes rectilinearly polarized light. Polarizing directions are selected by using a mirror or a prism as the first reflecting optical system 3 for the longitudinal or the lateral direction in the construction of FIG. 1 such that the optical systems subsequent to the modulator 4 are not affected. This is illustrated in FIG. 3, wherein it is seen that if the beam from the laser oscillator 2 is laterally polarized light, a prism K instead of a mirror is employed to change the polarizing direction of that beam to the longitudinal direction. If the laser beam is monochromatic light and has insufficient power, two spectra may be used. This may be accomplished by either of two methods, one of which is to use two relatively close wavelengths to effect the polarization within a range for which the variation in chromatic aberration of the optical system is small and the other method is to use two separate wavelengths. In the former method, use may be made of an optical system in which the variation in chromatic aberration is small for two wavelengths, 488 mm and 514.5 mm, of Ar laser and in the latter method, two points for the two-point correction of the chromatic aberration in the optical system may be chosen as the spectra.

The modulator 4 may be, for example, an acousto-optic element which may use a black diffracted beam and the zero-order light of the diffracted beam may be used as the recording beam. The acousto-optic element (hereinafter referred to as AO element) may comprise, for example, optical crystal consisting of TeO₂ or optical glass and an ultrasonic wave transducer secured to the end face of the optical crystal or the optical glass, whereby a high frequency controlled by recording signals may be applied as input to the ultrasonic wave transducer so that an ultrasonic wave travels through the optical crystal or the optical glass. The polarizing direction of the laser beam is the S-direction with respect to the wave front of this ultrasonic wave in order to enhance the intensity of diffracted light.

Figure 4:
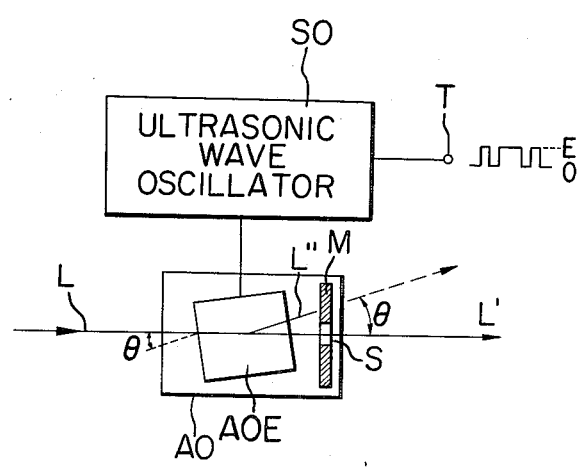
FIG. 4 is a view for illustrating the modulation.

For further description, reference will now be had to FIG. 4. An ultrasonic wave modulation element AOE forming the ultrasonic wave modulator AO is arranged so that the laser beam L having a predetermined beam intensity which is emitted from the laser oscillator enters the ultrasonic wave modulation element AOE at an angle θ1 (Bragg angle) therewith, and a mask M is disposed outside the ultrasonic wave modulating element AOE so that the beam passed through the ultrasonic wave modulation element passes through the slit in the mask M and the beam L' (zero-order light) passed through the slit is projected upon the recording medium.

On the other hand, a digital signal variable between O(V) and E(V) is applied to a terminal T and when the voltage E(V) is applied to this terminal, the ultrasonic wave oscillator SO oscillates and an ultrasonic wave signal is applied to the ultrasonic wave modulation element AOE, so that the beam L is deflected to provide a beam L". This beam L" (primary light) is shielded by the mask M against emergence from the ultrasonic wave modulator AO. When the voltage O(V) is applied to the terminal T, the ultrasonic wave oscillator SO does not oscillate and the beam L is not deflected and emerges as the beam L'.

In the case of FIG. 4 where zero-order light is so utilized as the ON-state of laser beam, more than 90% of the incident beam may be utilized but the extinction ratio obtained is only 3 or so. Therefore, where the recording medium in use is of low γ-value like silver salt film, the use of the modulator of FIG. 4 in which the extinction ratio is only 3 or so would cause fog and thus, such modulator could not be used. However, where the recording medium in use is a heat mode recording medium formed by the use of evaporated metal film or the like which may be evaporated and deformed by intensely condensed energy of laser beam, a great threshold value exists in the condensed energy and the γ-value is high. In such a case, the extinction ratio is of the order of 3 but no fog is created and the modulator of FIG. 4 may be used. Thus, in this latter case, more than 90% of the energy of the incident beam may be utilized and the rate of energy utilization obtained will be about 1.5 times as compared with the case where use is made of a modulator in which primary light is directed outwardly from the modulator. Where utilization is made of a sensitive material of relatively low sensitivity such as evaporated metal film, such an enhanced rate of energy utilization has very great merits. For example, in the case of the laser beam of the same energy, the recording speed obtained will be 1.5 times as great. In the case of a laser processing device, there is also a relatively great threshold value in the laser processing energy and the γ-value is high and thus, utilization of the modulator of FIG. 4 will be more advantageous.

The term γ as used therein means, in FIG. 20, the gradient of a tangential line with respect to a characteristic curve J of a certain recording medium at a point whereat the characteristic curve intersects the abscissa, and in FIG. 20, it refers to b'/a'.

In order that recording may be effected on the recording medium by zero-order light as already mentioned, it is necessary that the laser energy in its ON-state be greater but the laser energy in its OFF-state be smaller than the point A in FIG. 20 which is the threshold value of the sensitivity of the heat mode recording medium and in addition, it is desirable that γ be greater than 1.5.

In the utilization of primary light of the modulator AO, the angle of diffraction differs depending on the wavelength of the laser beam, but in the utilization of zero-order light, the emergence of the beam occurs in the same direction irrespective of difference in wavelength and therefore, the spot diameter with which a laser beam such as Ar laser having a plurality of output wavelengths is condensed by a condenser lens is smaller than when primary light is utilized. This means the possibility of recording or processing at a higher resolution.

As described above, where use is made of a recording material having a high γ-value (especially, heat mode recording medium) or processed material, the use of an ultrasonic wave modulator utilizing zero-order light as the light energy in its ON-state will lead to great merits in the rate of energy utilization and the resolving power.

However, in the design shown in FIG. 4, care must be taken of the fact that the modulaor as such is in OFF-state when zero-order light is in ON-state.

Accordingly, when the signal for driving the modulator is in ON-state, the laser beam is in OFF-state and when that signal is in OFF-state, the laser beam is in ON-state, and this means that the negative-positive is reversed as compared with the case where primary light is utilized.

The reversal of the negative-positive, however, need only be accomplished by reversing the sign of the driving signal.

Further, the common laser recording apparatuses known today are designed such that the laser beam from a laser oscillator is applied to a modulator for modulation, the modulated laser beam is deflected by a deflector, the position of the deflected beam is detected by a beam position detector and in a predetermined time after the detection of the beam by the beam position detector (or after the arrival of the beam at the record starting position), recording signals are applied to the modulator.

In the conventional recording apparatuses, therefore, it has been necessary to control the apparatus such that as the laser beam deflected by the deflector passes by the beam position detector, it illuminates the beam position detector and for the said predetermined time after such illumination (or until the beam arrives at the record starting position), the beam does not emerge from the modulator.

However, where the zero-order light is used as the recording beam, as already described, about 30% of the beam light is leaking even when the beam is intercepted by the modulator and such leaking beam can be detected by the beam position detector, so that the modulator can be controlled so as to intercept the beam light continuedly until the beam arrives at the record starting position.

With such a construction, control of the beam applied to the modulator is simplified.

Further, outside the effective area of the recording medium to be illuminated by the beam (the area to be illuminated by the beam modulated by recording signals), even if the beam is in OFF-state, a sufficient intensity of beam is thrown, whereby such leaking beam during the OFF-state enables the focusing, tracking or the like of the beam, and if the recording medium is film, the information pre-recorded at the end of the film can be read by such beam during the OFF-state.

Still further, both the zero-order light L' and the primary light L" in FIG. 4 assume Gaussian distribution as their energy distribution and the peak of the energy distribution of the zero-order light L' on the straight line L" but the peak of the energy distribution of the leaking beam in the OFF-state of the beam is a composite of the part of the primary light which emerges as such light without being deflected and therefore, the latter peak becomes somewhat deviated toward the primary light side, or in the drawing, toward the L" side.

That is, deviation occurs between the position whereat the zero-order light during non-application of high frequency signal to the modulator illuminates the recording medium and the position whereat the leaking beam during application of high frequency signal to the modulator illuminates the recording medium.

Therefore, if the rotatable mirror 9 is so disposed that the zero-order light and the leaking beam lie at a common scanning line, when the leaking beam precedes the zero-order light, this leaking beam pre-heats the recording medium to enhance the effective sensitivity of the recording medium.

Also, when the leaking beam succeeds the zero-order light, scanning may be effected by heat treatment to eliminate any strain.

In this manner, the zero-order light can be subjected to pulse modulations (pulse width modulation, pulse code modulation, etc.) by ON and OFF of high frequency signal resulting from ON and OFF of the recording signal from the driving system.

The light from the element AOE of the modulator 4 passes through the reflecting optical systems 5 and 6 to the beam expander 7. This beam expander 7 serves to expand the diameter of the beam entering thereinto, and its magnification is five times, for example. Generally, when a parallel beam having a beam diameter D is focused by a focusing lens, the spot thereof forms a so-called airy pattern, and the size δ of the expansion of the zero-order light thereof (airy disc) is expressed as $$\delta = 2 \times 1.22 \times f/D \times \lambda \quad (1),$$

where
f = focal length of the focusing lens,
D = diameter of the entering beam and
λ = wavelength used.

Therefore, to provide a small beam diameter, D must be increased if λ and δ are constant, and this necessitates the provision of the beam expander. Further, the beam from the beam expander optical system 7 is reflected by the fourth reflecting optical system 8, whereafter the deflection and scanning of the beam is effected by the rotatable mirror 9. This is illustrated in FIG. 5, wherein FIG. 5a and b are a perspective view and a top plan view, respectively. The parallel beam reflected by the fourth reflecting optical system 8 passes through the window 13 to the rotatable mirror 9. The reflected light from the rotatable mirror 9 re-passes through the window 13 to the focusing lens 11, by which the light is focused as a spot on the recording medium. The direction of the reflected light is varied by the rotation of the rotatable mirror 9 so that the spot scans over the recording medium. The angle then formed between the incident beam on the rotatable mirror 9 and the optic axis of the focusing lens 11 is 60°, for example. This is because such angle can reduce the diameter of the rotatable mirror 9 by about 20%, as compared with a case that the angle of incidence is 90°. The rotatable mirror may consist of, for example, sixteen surfaces and may be formed of, for example, quartz glass which may withstand rapid rotation. The window 13 is provided to isolate the rotation of the rotatable mirror from the atmosphere, and may form a part of the protective cover 10a' provided so as to surround the rotatable mirror 9, but in the present apparatus, the single window serves dual purposes, namely, the entrance to and the exit from the rotatable mirror 9. The focusing lens is formed substantially without aberration and its performance is determined only by the influence of diffraction. The diameter of the airy disc resulting from diffraction is approximately 6μ for the reduction rate of 48X.

Description will now be made of the synchronizing system used when the heat mode recording is effected by the laser beam scanning over the recording surface. When the recording is effected by scanning over the recording surface, it is necessary to provide synchronism of the signal in each scan. Especially, where the rotatable mirror 9 is used, any poor precision of the division between each surface thereof would cause the position of the signal for each scanning line to be varied with respect to the scanning direction in accordance with the error of the angle of the surface when such signal is superposed on the laser beam, and the variation would appear in the form of jitter. It is therefore necessary to ensure the top of each scan of the pattern recorded by each scan to be regularized, and this in turn necessitates the synchronizing system. Especially, in the present apparatus which is a minute pattern scanning apparatus for effecting recording on microfilm, the requirement for the precision of synchronization is remarkably exacting. In the present apparatus, the synchronizing beam is taken out from the window 13 inserted between the rotatable mirror 9 and the focusing lens 11 and is condensed by the use of a focusing lens 15 for synchronizing beam having a focal length longer than that of the focusing lens 11, thereby enhancing the precision of synchronization and reducing the variation in angle of exit resulting from unexpected vibration of the window 13.

Further, since the window 13 for taking out the synchronizing beam is also used as the window of the rotatable mirror 9, the necessity of inserting any special means is eliminated and the spacing between the rotatable mirror 9 and the focusing lens 11 can be reduced, thus preventing the diameter of the focusing lens 11 from being increased.

The half-mirror portion 13a and the reflecting surface 13b of the window 13 comprise two parallel surfaces which theoretically eliminate the variation in angle of emergence of the emergent beam from the window resulting from unexpected vibration. The synchronous beam emergent from the window 13 scans over the surface of the knife edge 17a, as already described. Disposed behind the knife edge 17a is a diffusing plate 17b and a detection element 17, so that when the synchronizing beam is caused to come to a predetermined position by the knife edge 17a, light comes to the detection element and upon detection of the rising thereof, the control circuit is operated to count clock pulses. When a predetermined count number is reached, necessary information is delivered through a modulator control circuit 25 into the modulator 4 to effect modulation of the light beam. The focal length of the focusing lens 15 for the synchronizing beam is sufficiently greater than the focal length of the focusing lens 11, as already mentioned, and this leads to the following effects:

(A) Alleviated requirement for the accuracy of the knife edge mounting position (scanning direction);

(B) Reduction in the error of synchronization attributable to the vibration of the knife edge; and (C) Alleviated requirement for the accuracy of the mounting position attributable to increased depth of focus (defows direction)

The recording medium 12 will now be explained.

The heat mode recording medium used with the present invention basically comprises a base 301 and a recording layer 302 formed thereon, as shown in FIG. 16(B). Usually, it may comprise a base 301, an undercoat layer 303, one or more recording layers 302 and an overcoat layer 304, and the recording layers may be provided on the opposite surfaces of the base. Besides these, there may be numerous possible types of the recording medium. A common fact to them is that when a laser beam is condensed and thrown upon them, the recording medium(s) or adjacent layer absorbs the laser light, as a result of which the energy of the laser light is converted into heat energy, by which the recording layer(s) is melted and condensed or partly boiled and evaporated or scattered, whereby the recording layer(s) is deformed or removed with a result that the portion of the recording layer which has been irradiated with the laser light becomes transparent. Such a recording medium has numerous features as described above, thereby enabling realization of a COM (Computer Output Microfilmer) device of the rapid access type which can rapidly provide microfilmed images without the necessity of image development. In order to be applicable to the apparatus of the present invention, the recording medium must satisfy the following requirements:

(1) Sufficient mechanical strength to withstand handling as microfilm;

(2) Sufficient durability and anti-environmental property to ensure preservation as microfilm;

(3) Sufficient sensitivity to be applicable to the recording speed of COM; and (4) Sufficient resolving power to provide microimages with sufficient contrast.

A recording medium which satisfies all these requirements and which is best suited for the purpose of the present invention comprises a base formed of polyester film and a recording layer formed by lamination of Bi or Ge and GeS layer. A recording medium which substantially satisfies the abovementioned requirements and which is applicable to the apparatus of the present invention may comprise a suitable combination of constituent layers which all hereinafter be described. Whatever construction is adapted, the base and at least one recording layer are indispensable to form a recording medium.

Constituent Layers of Recording Medium

| Constituent layer | Preferred characteristics | Specific materials | Thickness |
|---|---|---|---|
| Base layer | Film-like; High heat transfer rate and elasticity; High thermal resistance and transparency | polyester, polyethylene acetate, vinyl chloride or other high molecular materials | 50–150$\mu$, usually 75–120$\mu$ |
| Undercoat layer | Low heat transfer rate; Capability of enhancing the intimate contact of the recording layer with the base layer | Inorganic dielectric materials such as oxides or fluorides including $MgF_2$, $Al_2O_3$, SiO; polystyrene, poly-para-xylylene, methylmethacrylate, iso-butylmethacrylate, acrylic resin, linear saturated polyester or other resins | 0.01–100$\mu$, usually 0.1–20$\mu$ |
| Overcoat layer | Capability of protecting the surface against injuries as a protective layer | See undercoat layer | 0.1 to several tens of microns, usually 2–10$\mu$ |
| Recording layer | High light-absorbing property; Low melting point; Ensuring 0.8 or higher optical density contrast; Stability for temperature and humidity; Capability of being formed into thin film | Metal, semi-metal or semiconductor such as Al, Pt, Rh, Au, Cu, Sn, In, Zn, Bi, Ge, Si, Cr, Pb; Alloy such as Pb-Sn, Zn-Al; Metal-to-metal compound such as InSb, GaAs; Metal oxides such as In-O, Sn-O, Pb-O, W-O, Ti-O (light-absorbing property); Simple substance of S, Se or Te; Chalcogenide crystalline materials and non-crystalline chalcogenide glass materials containing S, Se, Te, and in addition, containing metals, semimetals or semi-conductors belonging to Ib-Vb groups, and which may further contain other elements as additives. There are so many specific examples of the materials that not all of them can be mentioned herein, but especially typical systems are: Ge-S, Si-S, Bi-S, In-S, Pb-S, Sn-S, Cd-S, Zn-S, etc. | 0.01–1$\mu$ usually 0.3–0.03$\mu$ |

It has been found that recording mediums having an overcoat layer as the surface protecting layer or recording mediums whose multiple recording layers have a surface layer of Ge, Si, metal oxides or chalcogenide material are not injured when film driving is effected in the apparatus of the present invention.

In applications wherein a driving roller or the like makes contact with the recording layer, the roller or the like may preferably be formed of rubber or other soft material than metal and the surface thereof must be smooth without any protrusion or the like.

The provision of the surface protecting layer somewhat reduces the sensitivity of the recording medium and therefore, it is especially important that the above-mentioned considerations be given to the driving roller if it is desired to increase the recording speed or to decrease the laser output. It is also necessary that the contact of the roller or the like with the recording medium should always be rotational contact and sliding contact be avoided as far as possible. Formation of the recording medium is accomplished chiefly by the vacuum evaporation technique but the recording medium may be manufactured at a very low cost by continuously effecting the evaporation while winding a film of long footage and great width. The equipments for carrying out such continuous evaporation technique have been sufficiently established in these fields of art and it is well-known that aluminum evaporation paper, titanium evaporation film for capacitors, etc. are commercially available at very low prices.

The recording process will now be described. The use of the heat mode recording medium already explained eliminates all of the post-treatments such as development and fixation as well as the other pre-treatments, so that the recording process becomes very much simplified, only requiring the irradiation with a laser beam.

For the recording, the laser beam may be projected from the base side or from the opposite side. Assuming that one surface of the recording medium is the front side and the other is the back side, the laser beam may be projected from the front side or from the back side or from both sides. For example, a laser beam may be projected from the front side and another laser beam from the back side, whereby data recording may be effected on the one hand and format recording, code recording or the like may be effected on the other hand.

During the recording, portions of the recording medium on which recording should be effected need only be moved to the laser beam projection position. At the laser beam projection position, a laser spot of high power density condensed through a focusing lens substantially linearly scans over the recording medium maintained within the depth of focus of the focusing lens, with an intensity subjected to intensity modulation or pulse code or pulse width modulation by an information signal. The scanning velocity of this spot may suitably be of the order of 10 m/sec. to 200 m/sec., with the laser output and the sensitivity of the heat mode recording medium taken into account. Such high-velocity scanning will hereinafter be called the main scanning. As opposed thereto, slow scanning, usually at a velocity of about 10 mm/sec., is effected in a direction substantially orthogonal to the direction of the main scanning. This latter scanning will hereinafter be called the auxiliary scanning. The main and the auxiliary scanning are combined together so that as a whole, the laser spot effects raster scanning over the recording layer. Since the auxiliary scanning is slow, the recording medium may be moved instead and such a method is adopted in the present invention.

During the recording, the laser spot has a diameter of several microns. In COM, the reduction rates are variable such as 24×, 42×, 48× and so on, of which it is noted that 48× is generally the main rate. The reduction rate of 48× (which means 1/48) is now taken as an example. Assuming that one alphanumeric character is formed by a dot matrix of 7×9 dots, the suitable size of the one character including space portions is that corresponding to 9×15 dots, in respect of the dignity of the characters, recording speed, etc., and in that case, the dot pitch is about $6\mu$ longitudinally and laterally. Therefore, the size of a dot should desirably be such that record track of $6\mu \psi$ can be formed on the recording medium. Assuming that dotted characters are to be recorded, the recording speed of COM is usually 10000–20000 lines/minute, each line consisting of about 132 characters. In this case, the duration of the laser pulse corresponding to one dot is several tenths to several hundredths of a seconds.

If the main scanning speed is high as already mentioned, the laser spot by the main scanning runs over several microns within one-dot recording time. Therefore, the shape of the laser spot should preferably be an ellipse having its major axis in a direction perpendicular to the main scanning direction, rather than a circle. Such an ellipse can be readily realized by the use of a prism which will enlarge the laser beam diameter only in one direction, or a cylindrical lens, or a rectangular opening disposed on the path of the laser beam.

However, microimages are usually observed as the images enlarged by a microfilm reader or printer and the optical system used for the enlargement has a moderate resolving power and thus, even if portions having no aperture of several microns were formed between the main scanning lines, these would never degrade the quality of the image but rather look as if they increased the sharpness of the image. Accordingly, in order that apertures may be formed so as not be create any gap between dots, a recording track of $6\mu \psi$ should be formed in the aforementioned example but in practice, a recording track corresponding to one-half of the dot path, namely, of the order of $3\mu \psi$, will be sufficient, if formed. In this case, as will be apparent from the foregoing description, unrecorded gaps of $3\mu$ are created between the scanning lines, while in the direction of the scanning lines, recording can be accomplished continuously between dots. This may be easily realized by increasing the pulse width of the signal applied to the modulator to record picture elements, and the resultant images will be of very sharp quality.

In order that black portions may be formed between the beam scanning lines formed on the recording medium by the main scanning as described, the main scanning period T, the movement velocity V of the recording medium in the auxiliary scanning direction and the size D of each formed dot on the recording medium in the auxiliary scanning direction may be determined so as to satisfy the relation that $T \cdot V > D$.

Usually, the heat mode recording medium has a recording characteristic of very high $\gamma$-value and requires a power density at a value exceeding a certain threshold in order that recording may be accomplished thereon. Therefore, even if a spot having a spot size of $10\mu$ as measured of the diameter of an airy disc is thrown upon the recording medium, the diameter of the aperture formed thereon will be less than 10μ when the spot is stationary on the recording medium and thus, the diameter of the aperture is related to the laser power and the sensitivity of the recording medium, but the diameter of the aperture is usually of the order of 5μ. If the power density is relatively adjusted it will be readily possible to form an aperture of 1μ or less even though the original laser spot is as much enlarged as up to 10μ.

Accordingly, where a heat mode recording medium is used, it is possible to provide a dot pattern having a desired size or line width by controlling the voltage level of the high frequency signal applied to the modulator which controls ON-OFF of the laser or by controlling the period of time during which the beam is thrown upon the recording medium to form a picture element thereon.

If the design is made such that the dot size can be controlled in this manner, the reduction rate may be varied by reducing the dot size and by varying the clock frequency and the movement velocity of the recording medium. As will later be described in greater detail, the recording signals applied to the modulator are successively read by a shift pulse being applied to a shift register, and since a clock pulse is used as such shift pulse, it is possible to increase the recording signal frequency by increasing the clock pulse frequency.

Since the scanning velocity of the beam is constant, the size of the recorded pattern on the recording medium in the beam scanning direction is reduced by increasing the recording signal frequency as described.

If no more procedure is added, the size of the pattern in the direction perpendicular to the beam scanning direction will not be varied and in order to vary the size in such perpendicular direction at the same time, it is therefore preferable to vary the movement velocity of the recording medium.

The relation between these two velocities is such that the lengthwise and widthwise reduction rates on the recording medium become equal by setting the movement velocity of the recording medium to 1/N times the clock frequency N. On the basis of the same concept, it is of course possible to realize enlargement as well as reduction.

Where it is desired to realize a recording speed of 10000–20000 lines /min. at a reduction rate of approximately 48× by using a heat mode recording medium, the laser output required is several hundred mW at the outlet of the laser oscillator, although two-thirds of the output is lost in the optical system en route. If the loss in the optical system is minimized and use is made of a recording medium whose highest energy sensitivity is below $10^6$ erg/cm$^2$, a laser having an output below 100 mW may be employed as well. In the present invention, a suitable output is in the range of 50 mW to 2 W. The wavelength of the laser is not specifically restricted by lasers from the ultraviolet to the visible, infrared range may all be used. To be incorporated into the apparatus, the desirable laser is not of the water-cooled type but of the air-cooled type of the type in which liquid coolant is used only within a closed system (namely, which has a heat exchange adapter), although in the latter type the output is several watts or less.

When the output of an argon laser beam of wavelength 4880Å was 400 mW, the overall transmission rate through the optical system including the reflecting optical system, the A/O modulator, the beam expander, the rotatable mirror and the f.θ lens in the window was about 50% and the power reaching the surface of the recording medium was about 200 mW.

In this case, use was made of an optical system which provided a diameter of 6 μψ for the airy disc and scanning was effected at 28 m/sec. for the main scanning velocity and at 7.06 mm/sec. for the auxiliary scanning velocity, and the recording medium used had a recording medium (optical density 1.4) comprising a first layer of Bi 500Å and a second layer of GeS 500Å successively overlaid on a polyester film having a width of 15.95 mm±3/100 mm and a thickness of 75 μ. The recording was effected by a method whereby the laser beam was thrown from that side of the base opposite to the polyester film so that two pages spread open as shown in FIG. 6 were recorded at the reduction rate of 48× within the effective image field width of 14.8 mm. The image so recorded was sharp with high contrast (optical density difference 1.2). The scanning line width was about 3 μ. Also, by the use of a laser beam power adjusting mechanism as already mentioned, three or more pages could be recorded at a time with the reduction rate altered.

In an apparatus using a recording medium in which no protective layer is provided but the recording layer is directly exposed, the following considerations are important and effective. In the heat mode recording using such recording medium, the recording layer is somewhat evaporated or scattered, as a result of which the portion of the recording medium adjacent to the irradiated portion smells during the recording, depending on the material of the recording layer. To prevent this, highly adsorbent powdered material such as activated carbon or the like may be disposed above and/or below the plane formed by the beam scanning, in the irradiated portion including the recording medium, namely, within the casing of the camera portion, or more specifically, between the focusing lens 11 and the recording medium 12. In some cases, an air stream may be circulated through the adsorbent. Whenever the above-mentioned evaporation or scattering occurs, if the recording layer is directly opposed to the lens, the evaporated or scattered material may stick to the lens surface to cloud the same. To avoid this, the working distance (the distance from the lens surface to the recording surface) may be chosen to several times the average free stroke of the evaporated material, namely, 2 to several millimeters, or wind may be applied between the focusing lens 11 and the recording medium to blow away the evaporated or scattered material. Such wind laterally applied to the recording medium is also effective to blow away the recording layer when in molten state, thereby bringing about substantially enhanced sensitivity. As a further countermeasure, a replaceable thin transparent sheet such as plastic film or glass sheet may be inserted between the lens and the recording surface and such sheet may be suitably replaced by a new one when desired.

Also, if a dot size designating signal for designating the dot size for each character code representing a character or symbol to be recorded is provided so that dot size is controlled during the recording of a character or symbol by controlling the laser beam intensity or the pulse width of the recording signal applied to the modulator in accordance with the designating signal, then half-tone recording may be easily accomplished. To so vary the pulse width, a plurality of gating clock pulses differing in pulse width but equal in frequency may be prepared beforehand, and selected one of these gating clock pulses and the recording signal read from a later-described shift register may be applied to an AND gate to thereby form a recording signal having the same pulse width as the selected gating clock pulse. (However, this is possible only when the pulse width is to be reduced.)

In FIG. 1, the laser oscillator 2, the beam intensity regulator S3, the modulator 4 and the reflecting optical system 3 and 5 are disposed in the bottom of the frame 1 having a strength sufficient to protect them against deformation by extraneous pressure, vibration or the like. The frame 1 has casters 22 at the bottom thereof so that it may readily be moved or fixed as desired.

On top of the frame 1, there is a plate 18 having a sufficient thickness to withstand twist or bending and having an upper surface which has such a degree of planarity as may practically provide a reference surface for optical adjustment. On the upper surface of the plate 18, there are disposed the reflecting optical system 6, 8, beam expander 7, rotatable mirror 9, motor 10, beam detecting portion 19, beam intensity regulator S4 and film drive-recording portion 21 provided with the focusing lens 11, all these being secured in such a manner as to maintain optical coupling to one another.

Since the above-mentioned optically functional elements are made integral with one another by the plate 18, they may commonly be susceptible to the influence of extraneous displacement and vibration and the optical adjustment between them can be readily effected with the upper surface of the plate 18 as the reference.

On the lower shelf of the frame 1, there is mounted a power source section 23; on the intermediate shelf, there is mounted a laser driving circuit 24, a modulator control circuit 25, a rotatable mirror motor control circuit 26 and a film control circuit 27; and on the upper surface, there is mounted an interface circuit 28.

The outer sides of the frame 1 are covered with side covers 29, 35, 36 and top covers 30, 31 so that outward leakage of the laser beam may be prevented.

The internal temperature of the present apparatus hermetically sealed by the plurality of outer plates become fixed at a level higher than the ambient temperature, due to the heat sources such as the laser oscillator 2, the laser driving circuit 24, the power source section 23, etc. and therefore, the adjusted conditions of the laser oscillator 2 set to the predetermined value and other optical elements may be varied by a variation in the internal temperature resulting from a variation in the ambient temperature and even if the variation is very slight, a great deviation will occur when viewed with respect to the entire optical path and thus, the intensity of the laser beam on the recording medium will be fluctuated.

Also, when power supply is to be re-started after a stoppage of power supply to the apparatus, some time is required until the internal temperature rises to a predetermined value. To overcome such problem in the present apparatus, there are provided within the apparatus temperature regulating means for heater R and blower F and a temperature control circuit 38 for controlling the temperature regulating means. The temperature control circuit 38 may control the heater R and the blower F to thereby maintain the internal temperature always at a predetermined value in compliance with the variation in ambient temperature during power supply or non-power supply to the apparatus.

Further, the temperature control circuit may be designed such that power supply to the temperature control circuit is not cut off even if the power supply to the apparatus is cut off and that power supply to the apparatus is cut off when power supply to the temperature control circuit is cut off, whereby any fall of the internal temperature may be prevented during cut-off of the power supply to the apparatus.

On the surface of the plate 18 seen in FIG. 1, reference-holed plates 32, 33 and 34 formed with holes H1, H2 and H3, respectively, are secured at mechanically determined positions so that the centers of the holes are optically aligned with one another. The first reflecting optical system 3 is adjusted so that the laser beam from the laser oscillator 2 is passed through the modulator 4 for polarization and modulation. Next, the reflecting surfaces of the reflecting optical systems 5 and 6 are rotatively adjusted so that the beam from the modulator 4 passes through the centers of the holes H1 and H2 of the reference-holed plates 32 and 33. Subsequently, the reflecting optical system 8 is adjusted so that the laser beam from the center of the hole H2 passes through the center of the hole H3 of the reference-holed plate 34. After the adjustment of the optic axis by the plurality of reflecting optical systems has been done, the fixed position of the mount plate 37 of the beam expander 7 relative to the plate 18 is adjusted so that the laser beam passes through the center of the optic axis of the beam expander. The laser beam from the hole H3 impinges on the rotatable mirror 9 and is reflected and polarized thereby to enter the focusing lens 11. Adjust screws A1 to A4 (of which A3 and A4 are not shown) provided on the opposite sides of the film driving portion 21 are rotated so that the center of the scanning plane of the polarized beam passes through the center of the optic axis of the focusing lens 11 and that the scanning plane of the polarized beam is orthogonal to the auxiliary scanning direction of the recording medium 12, thereby varying and adjusting the level and horizontality of the film driving-recording section 21 with respect to the plate 18.

Figure 14:
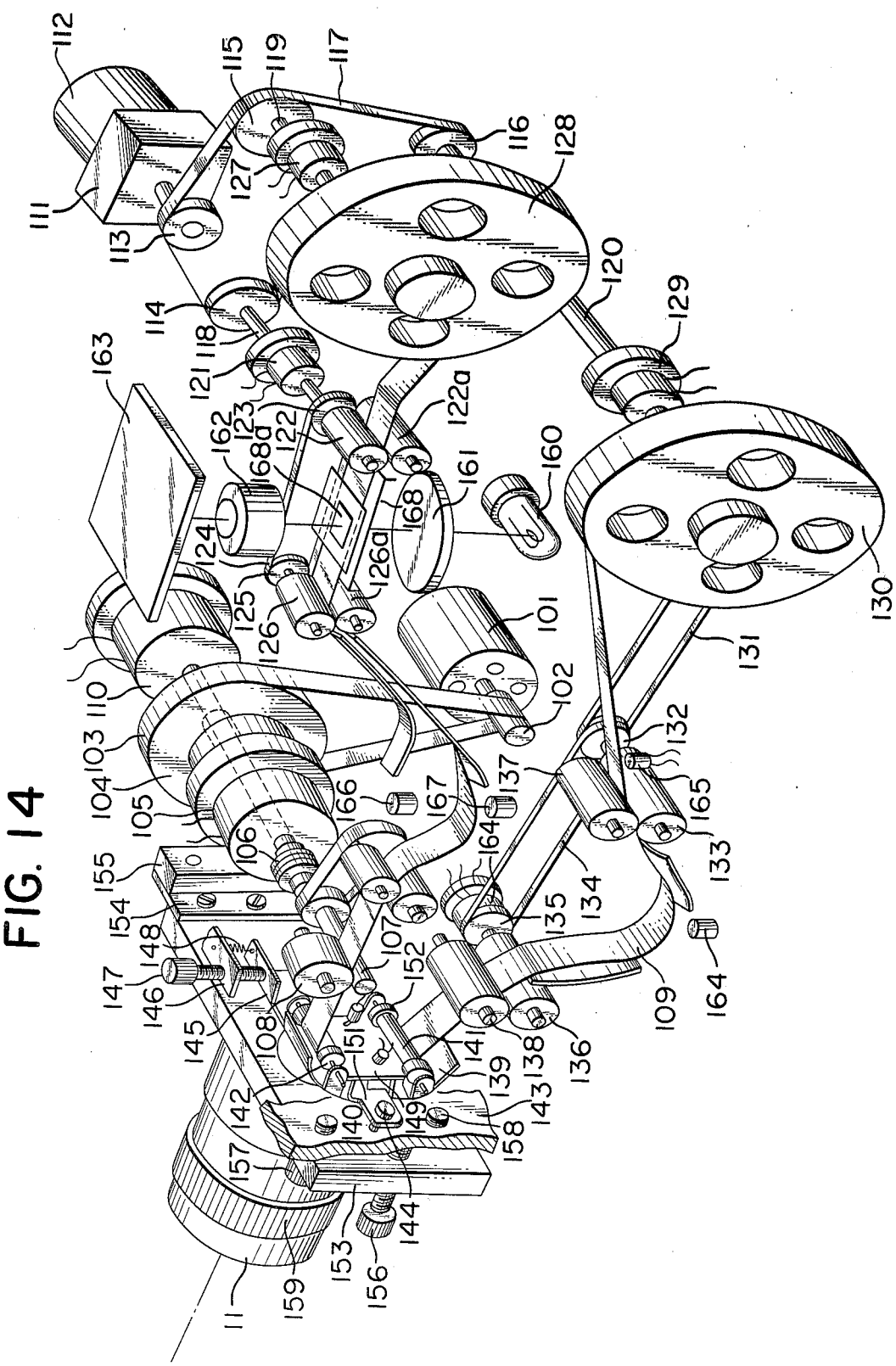
FIG. 14 is an enlarged perspective view of portions of the laser recording apparatus shown in FIG. 1.

As shown in FIG. 14 and as will later be described in detail, light sensing elements 151 and 152 are provided as the means for confirming whether or not the scanning beam from the rotatable mirror 9 is properly orthogonal to the auxiliary scanning direction of the recording medium 12. Thus, when the scanning beam enters the light sensing elements 151 and 152, these elements produce their outputs, respectively. Accordingly, said confirmation is accomplished by sensing whether or not those outputs have a predetermined output level.

Figure 7:
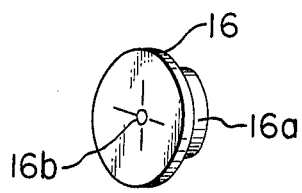
FIG. 7 is a perspective view of a cap.

By matching the diameters of the holes H1–H3 with the diameter of the laser beam, highly accurate adjustment of the optical axis is possible, but where the diameter of the laser beam is variable, the diameter of the holes may be increased in advance, and caps 16 each provided with a stepped portion 16a and a small target aperture 16b, as shown in FIG. 7, may be fitted into the holes H1–H3 whenever desired, and then the laser beam may be aligned with small aperture 16b, whereby it is also possible to accomplish the adjustment of the optic axis with good accuracy.

In the laser COM, the focusing lens 11 is made integral with the film driving section 21 to form the camera portion, and this camera portion may singularly be detached from the apparatus body to enable adjustment of the focal point of the focusing lens with respect to the film. In such case, if the focusing lens has been aberration-corrected with respect to the wavelength 6328Å of He-Ne laser, it is possible to adjust the focal point and register the film surface to the focus position by using the He-Ne laser and by the interference method similar to that of FIG. 15 in which the reflected light from the film surface is seized.

With the focal point so adjusted, the camera portion may be re-attached to the apparatus body, whereafter the optic axis may be adjusted. Since a small He-Ne laser is commercially easily available, it is highly effective in practice to abberation-correct the focusing lens for the wavelength of 6328Å in advance.

By reference to FIG. 1, description will now be made of how to prevent outward leakage of the laser beam when the apparatus of the present embodiment is partly opened inadvertently.

The side covers 29, 35, 36 and the top covers 30, 31 are designed to be opened to permit adjustment of the interior of the apparatus. These cover plates need not be opened during the use of the apparatus, but if they were opened by mistake, the laser beam might deviate from the optic axis for some reason or other and leak outwardly to adversely affect the human body.

To eliminate such risk, the apparatus of the present invention is provided with a plurality of means for generating signals in response to opening-closing of the portions covering the optical path section for the laser beam, so that whenever part of the portions covering the optical path section is opened, the signal generating means may generate an opening motion signal and a control circuit responsive to such opening motion signal cuts off the power supply to the drive source for the laser oscillator while, at the same time, means is provided to close the shutter T disposed in the optical path to thereby intercept the laser beam. There is also provided means for stopping or attenuating the beam modulation output of the modulator 4. It will also be effective to make such design that ND filter S1 forming the beam intensity regulator S3, S4 is inserted into the optical path in response to the aforementioned opening motion signal.

Opening-closing signal generators N1-N5 are provided corresponding to the portions covering the path of the laser beam, namely, the side covers 29, 35, 36 and the top covers 30, 31. Such opening-closing signal generators may comprise common mechanical-electrical contacts.

Figure 8:
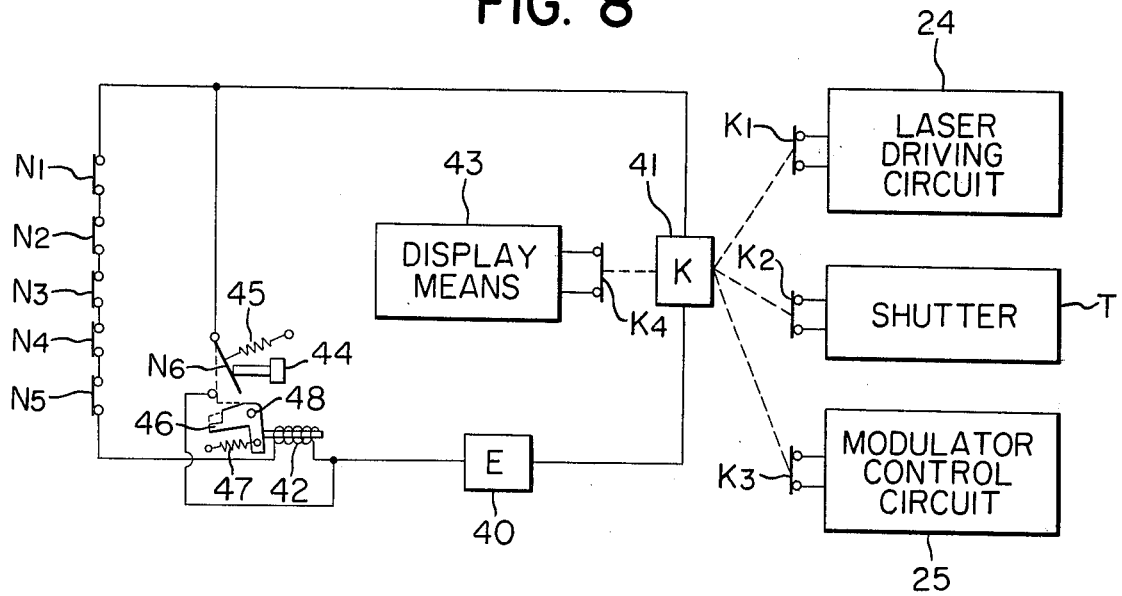
FIG. 8 diagrammatically shows a safety circuit for the laser recording apparatus.

FIG. 8 is a circuit diagram for illustrating the control responsive to the opening-closing signal generating means.

Connected in series with a power source 40 are switches N1-N2 forming the opening-closing signal generating means, relay means 41 and an electromagnet 42. When at least one of the switches N1-N2 is opened in response to opening of a side cover or a top cover, power supply to the relay means is cut off to change over the mode of the relay means. In response to such change-over of the relay 41, the power switch K1 for the laser driving circuit 24, the driving switch K2 for the light intercepting shutter T and the output control stop switch K3 for the modulator control circuit 25 are opened or closed, so that the laser oscillator 2 stops emitting the laser beam in response to said opening of the side cover or the top cover and the light intercepting shutter T shuts off the laser beam path while the modulator 4 stops putting out its laser beam modulation output.

The stoppage or shut-off of the laser beam emission may be used in one or more combinations as required.

Designated by 43 is display means such as lamps or the like for displaying whether or not the laser beam is being emitted into the optical path. If the laser beam is being emitted into the optical path, a red lamp or the like may be turned on by a switch K4 operatively associated with the relay 41, and if the laser beam is not being emitted, a blue lamp or the like may be turned on.

When the maintenance personnel opens the side covers or the top covers to adjust the optic axis, the laser beam must be emitted into the optical path with said side or said top covers kept open. When a switch button 44 is depressed against a spring 45 with the side or the top covers in open position, a switch N6 is closed. Since one of switches N1-N5 is opened, there is no current flowing to the electromagnet 42 and a crank lever 46 is released from the attraction of the electromagnet 42, so that the crank lever is pivotally moved clockwise about a pivot 48 by the action of a spring 47 to assume a position as indicated by dotted line.

The end of the switch N6 is thus received in a cut-away portion formed at the end of the crank lever 46, so that the return of the switch N6 by the action of the spring 45 is prevented and the switch N6 maintains its ON position to permit a flow of current to the relay 41, by which the mode of the laser beam being emitted into the optical path is maintained. When the maintenance personnel closes the side or the top covers, a current flows to the electromagnet 42, which thus attracts the crank lever 46, so that the crank lever is pivotally moved counter-clockwise about the pivot 48, whereby the end of the switch N6 is brought out of engagement with the cut-away portion at the end of the crank lever 46 and returned to its OFF position by the action of the spring 45.

Now, if the motor driving the rotatable mirror 9 seen in FIG. 1 stops running for some reason or other, the laser beam emergent from the rotatable mirror does not scan over the surface of the recording medium but is concentrated at one point thereon.

Such concentration of the laser beam at one point imparts a serious damage to a point of the recording medium. To overcome such disadvantage, the present invention provides means for detecting the operative condition of the motor 10 for driving the rotatable mirror 9 to thereby detect the stopped operation of the motor 10, and also means for stopping the emergence of the laser beam from the rotatable mirror in accordance with the stopped operation signal from the detector means.

The means for detecting the stopped operation of the motor 10 and for stopping the emergence of the laser beam from the rotatable mirror will hereinafter be described with respect to an embodiment thereof.

Figure 9:
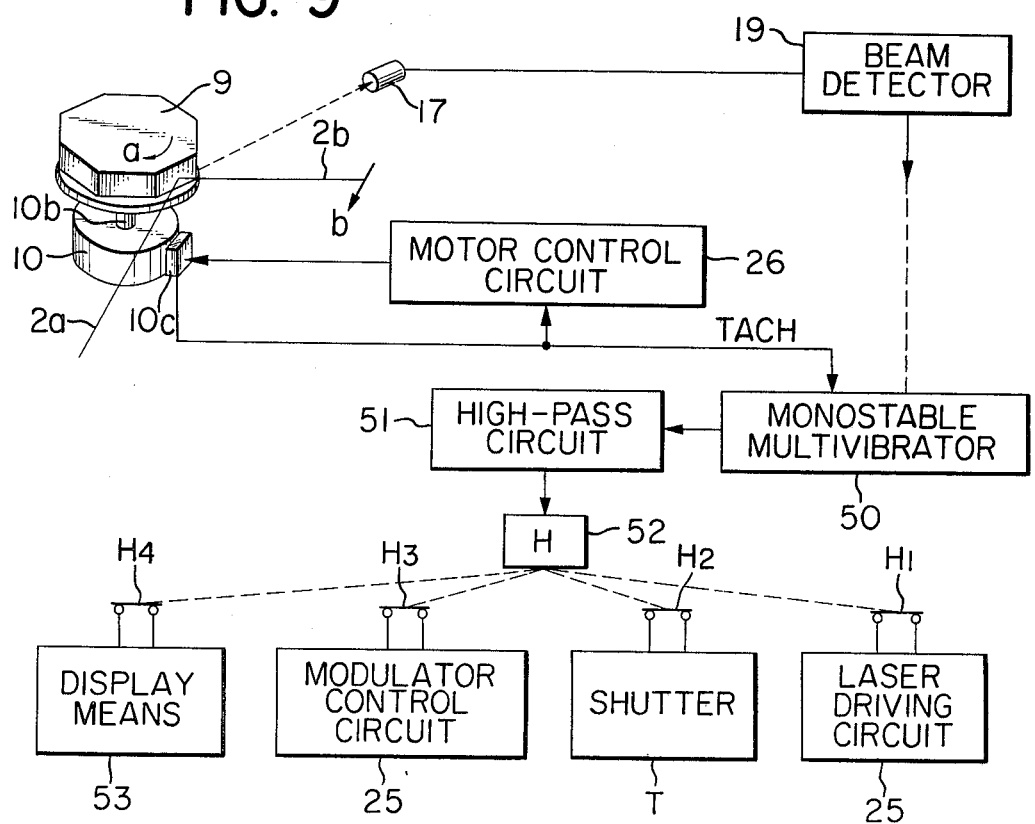
FIG. 9 diagrammatically shows a protective circuit for the recording medium.
Figure 10:
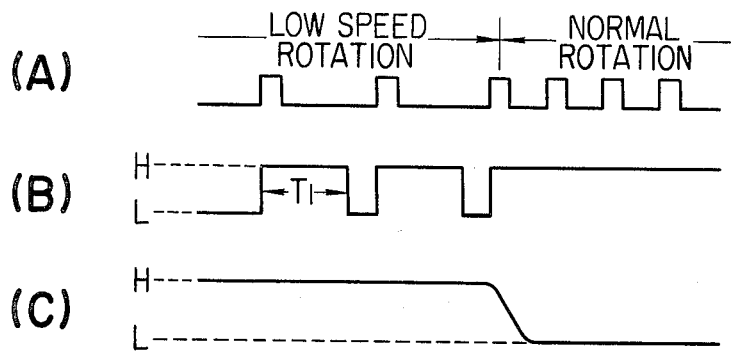
FIG. 10 shows signal waveforms for illustrating the circuit of FIG. 9.

Such an embodiment is illustrated in FIGS. 9 and 10. The rotatable mirror 9 mounted on the rotary shaft 10b of the motor 10 is rotated at a predetermined angular velocity under the control of the motor control circuit 26 of the motor 10 to thereby deflect the laser beam 2a put out from the laser oscillator 2. The motor control circuit 26 receives a rotation signal (hereinafter referred to as TACH signal) from a heat 10c provided on the motor 10, and compares this signal with a reference rotation signal contained in the motor control circuit 26 (as by rectifying the rotation signal pulse and taking it out in the form of a voltage), and whenever there is a difference between the two signals, the motor control circuit sends a correction signal to the motor 10 to control the motor so as to ensure it to rotate at the predetermined angular velocity.

The TACH signal is applied to a resettable monostable multicircuit 50, the output of which is passed to a high-pass circuit 51, whereby zero potential signal is provided when the motor 10 is rotating at the predetermined angular velocity and a predetermined potential signal is provided whenever the angular velocity is slowed down.

FIG. 10(A) illustrates the pulse periods of the TACH signal during the normal velocity rotation and during the slow rotation, respectively, of the motor. FIG. 10(B) illustrates the output waveform provided when the resettable monostable multicircuit 50 is triggered by the TACH signal shown in FIG. 10(A). FIG. 10(C) illustrates the output waveform provided by the output from the monostable multicircuit 50 being passed through the high-pass circuit 51.

The TACH pulse period during the normal velocity rotation is smaller than the single pulse width T1 of the monostable multicircuit 50, so that this circuit 50 is not reset and its output is a direct current.

On the other hand, the TACH pulse period during the slow rotation is greater than the single pulse width T1 of the monostable multicircuit 50, so that this circuit is reset and its output is an alternating current.

By the output of the monostable multicircuit 50 being passed through the high-pass circuit 51, zero potential is provided when said output is a direct current, namely, during normal velocity rotation of the motor, and slowed rotation signal potential is provided when said output is an alternating current, namely, during slowed down rotation of the motor.

In response to the mode of the relay 52 changed over in response to the slowed rotation signal potential, the current switch H1 for the laser driving circuit 24, the control switch H2 for the light intercepting shutter T, the output control switch H3 for the modulator control circuit 25 and the control switch H4 for the motor rotation condition display means 53 are all changed over, so that the laser beam oscillator 2 stops putting out the laser beam, the shutter T intercepts the laser beam path and the modulator 4 stops putting out its modulation output, whereby the emission of the laser beam into the optical path is stopped.

Reference will now be had to FIG. 11 to describe the operation involved from the reception of the pattern or character information from a computer until a desired hard copy is produced by the apparatus of the present embodiment. The information from the computer 60 is applied to the interface circuit 61 of the present apparatus in a predetermined format, either directly or through a storage medium such as magnetic tape or magnetic disc. Various instructions from the computer are decoded and executed by an instruction execution circuit 62. The data is stored into a data memory 63 in a predetermined amount. The data, in case of character information, is given in the form of binary code, and in case of pattern information, may be given in the form of picture elements forming the pattern or in the form of line data forming the pattern (so-called vector data). These modes are designated prior to the data and, in accordance with the designated mode, the instruction execution circuit 62 controls the data memory 63 and line data generator 64 so as to process the data. The line data generator 64 generates the last data corresponding to one scan line.

More particularly, when data is given in the form of character code, character patterns are read from a character generator 65 and character patterns corresponding to one line are arrayed and buffered, or character codes corresponding to one line are buffered and character patterns are successively read from the character generator 65 to prepare successively the data for modulating the laser light corresponding to one scan line. Also, in case the data is pattern information, the data is converted into scan line data to prepare successively the data for modulating the laser light corresponding to one scan line. The data corresponding to one scan line are alternately applied to a first 66 and a second line buffer 67, each comprising a shift register having a number of bits equal to the number of picture elements for one scan line, under the control of a buffer switch control circuit 68.

Figure 12:
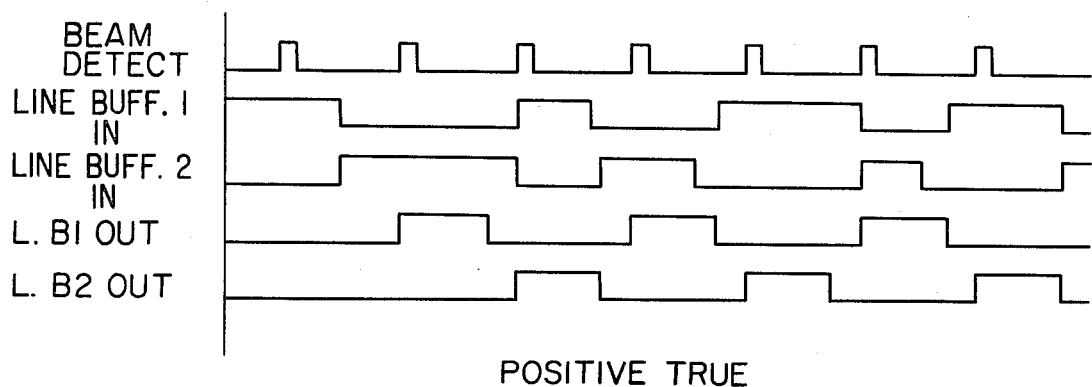
FIGS. 12 and 13 show waveforms for illustrating the laser recording apparatus of FIG. 11.

Further, the data in the first 66 and the second line buffer 67 are successively read by one bit corresponding to one scan line, with the beam detection signal from the beam detector means 19 as the trigger signal, and then applied to the modulator control circuit 25. During the while the beam provided by one reflecting surface scans over the recording medium, the data for one scan line stored in the line buffer are applied to the modulator 4, thus providing a light-and-dark pattern for one scan line. From the first and second line buffers 66 and 67, data are alternately read under the control of the buffer switch control circuit 68. The time relationship between these is illustrated in FIG. 12. As seen there, when data is being read from one of the line buffers, data is being written in the other line buffer. By such system, any and all of data can be applied to the modulator when the time interval from one reflecting surface to the subsequent reflecting surface of the rotatable mirror as it scans over the recording medium is very short. During the while one scan line is scanned, the recording medium is fed at a constant velocity and by an amount corresponding to a suitable interval between scan lines, and then stopped.

Film feed ready signal 62a, laser ready signal 72a and scan ready signal 69a are sent to the instruction execution circuit 62 and when all these signals are true, the film control circuit 27 receives print instruction from the instruction execution circuit 62 and starts the film feeding means 21 to effect film feed. A little later, a signal is applied to the modulator control circuit 25 so that predetermined image information is written in the recording medium 12.

The laser ready signal 72a may be provided by splitting the laser beam 2a from the laser oscillator 2 by a light splitter 70 disposed in the optical path and by causing the split laser beam to enter a photoelectric element 71 and detecting the output of the photoelectric element 71 by a detection circuit 72.

When the intensity of the laser beam put out from the laser oscillator exceeds a predetermined level, the beam output detection circuit 72 detects the output of the photoelectric element 71 having exceeded the reference level, whereupon it generates the laser ready signal 72a.

On the other hand, the scan ready signal 69a as the normal rotation ready signal for the rotatable mirror 7 may be generated by rpm detector means 69 when it detects the normal rotation of the motor 10 by the use of the technical means as described in connection with FIGS. 9 and 10.

A laser beam quantity control system will now be described with reference to FIGS. 1 and 11.

Aggravation of the rising output characteristic of the detection element 17 appears in the form of vibration of the recorded image. Such aggravation of the output characteristic is attributable to these factors:

(1) fluctuation and change in the laser beam intensity;

(2) modulation of the entering beam by mechanical vibration of the recording optical system elements; and (3) deterioration of the detection element and its associated circuit. For items (2) and (3) above, fixed countermeasures may be pre-arranged but for item (1) above, laser beam quantity control means becomes necessary.

The fluctuation and change in the laser beam intensity are attributable to (1) the variation in laser oscillator with time, (2) change in the recording sensitivity of the recording medium and (3) change in the recording speed.

As the means for eliminating the factor mentioned under item (1) above, in FIG. 11, the laser beam 2a from the laser oscillator 2 is split by the light splitter 70 disposed in the optical path, the laser beam split by the splitter 70 is caused to enter the photoelectric element 71 and in the detection circuit 72, the output of the photoelectric element 71 resulting from the entrance of said laser beam is compared with a set level, and by the resulting detection signal, the beam intensity regulators S3, S4 shown in FIG. 1 are moved to select an ND filter, whereby the intensity of the emitted beam from the laser oscillator and of the beam entering the beam position detection means 19 is made constant.

More particularly, the beam intensity regulators respectively comprise discs 20-1 and 20-2 each having a toothed peripheral surface and rotatable about its own axis, each of these discs 20-1 and 20-2 having a plurality of through-apertures formed on a common circumference, a plurality of ND filters S1 and S2 having different densities disposed in said through-apertures, drive gears 20-3 and 20-4 meshing with the teeth of said discs, and motors 20-5 and 20-6 for driving the gears 20-3 and 20-4 to thereby enable an ND filter having a desired esntiy to be positioned in the laser beam path. Thus, by selecting the ND filter S1 which transmits an optimal quantity of light by means of the beam intensity regulator S3 in accordance with the scanning velocity of the beam on the recording medium, recording may be accomplished under optical conditions; and by selecting the ND filter S2 of the beam intensity regulator S4 to adjust such that a predetermined quantity of light reaches the detection element 17, detection of the beam position may be accomplished under the same conditions.

Change-over of such ND filters S1 and S2 may also be accomplished by providing switches corresponding to recording machines in use, and driving the motors 20-5, 20-6 in accordance with selected switches so that the prescribed ND filters S1, S2 in the respective discs 20-1, 20-2 are inserted into the laser beam path.

In short, in such a case, selection of the ND filter S1 and the selection of the ND filter S2 are correlated.

As regards the factor for the change in the laser beam intensity mentioned under item (2) above, it is necessary to set the laser beam intensity in accordance with the types of the heat mode recording medium as the number of such types is increased. As to the factor mentioned under item (3) above, the recording speed is changed on the part of the recording apparatus in compliance with the change in reduction rate of recorded image or the difference in information processing clock pulse on the image information controller side, and the laser beam intensity must be varied in accordance with the change in the recording speed. For the cases of items (2) and (3) above, the laser beam intensity may be easily changed by automatically or manually changing the set value of the reference level in the detection circuit 72.

The light quantity control means may also be deflection filters or mechanical diaphragm means, instead of the ND filters.

The change-over of ND filters may alternatively be accomplished by detecting the variation in output of the detection element 17 resulting from the variation in intensity of the beam entering the beam detector means 19 and by operating the motor 20-6 by the detection signal to change over the ND filter S2.

Figure 13:
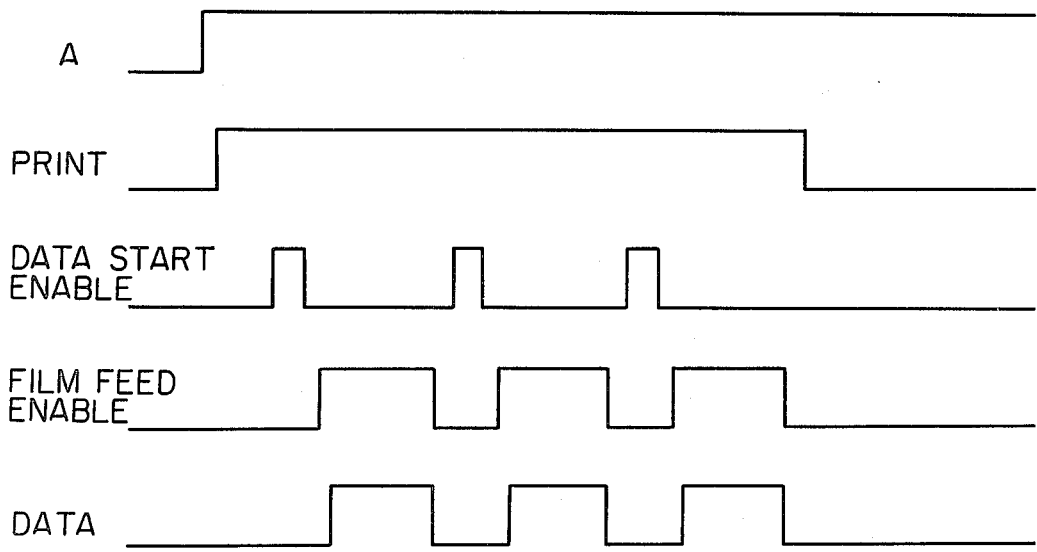

Reference will now be had to FIG. 13 to describe the types of the interface signal and the timing thereof. In FIG. 11, when the film in the film feeding means 21 is set to a prescribed position, the film control circuit 27 sends film feed ready signal (FIG. 3a) to the instruction execution circuit 62. When all the group of signals have become true, the instruction execution circuit 62 sends print instruction PRINT (FIG. 13b) to the film control circuit 27. Upon reception of the signal PRINT, the film control circuit 27 sends data start enable signal DSE (FIG. 13c) to the instruction execution circuit 62, and film feed is started by film feed enable signal FFE (FIG. 13d) from the instruction execution circuit 62. On the other hand, the signal FFE is passed through a delay circuit to provide a signal DATA (FIG. 13d) after a predetermined time, and this latter signal is applied to the modulator control circuit 25 to start the modulation mode of the modulator 4.

Reference will now be had to FIG. 14 to describe the film feeding means and the film feeding system in an embodiment of the present invention. A pulley 102 secured to the output shaft of a constant film feed motor 101 rotatable in synchronism with the reference pulse transmits the drive of the motor 101 to a fly-wheel 104 via a belt 103. Rotation of the fly-wheel 104 is transmitted through a clutch 105 quick in intermittent response, and further through a universal joint 106, to a capstan spindle 107. Film 109 is fed at a constant velocity while being pinched by and between the capstan spindle 107 and a pinch roller 108 urged against the capstan spindle 107 with a predetermined pressure force. Connected to the other end of the capstan spindle 107 is a quickly responsive brake 110.

On the other hand, rotative output of a motor 112 provided with a speed reduction mechanism 111 is transmitted through pulleys 113, 114, 115, 116 and belt 117 to shafts 118, 119, 120. Rotation of the shaft 118 is transmitted through a clutch 121 to a roller 122 and through the clutch 121, pulley 123, belt 124, pulley 125 to a roller 126. A pressure roller 122a serves to urge the film 109 against the roller 122 and a pressure roller 126a serves to urge the film 109 against the roller 126.

Rotation of the shaft 119 is transmitted through a clutch 127 to a take-up reel 128.

Also, rotation of the shaft 120 is transmitted through a clutch 129 to a supply reel 130 on the one hand, and through a belt 131 and a pulley 132 to a roller 133 on the other hand, and further through the pulley 132, belt 134, pulley 135, clutch 135a to a roller 136. A pressure roller 137 serves to urge the film 109 against the roller 133 and a pressure roller 138 serves to urge the film 109 against the roller 136.

A film focal point guide portion 139 has mounted thereon a back plate 140 and guide rollers 141, 142. The film focal point guide 139 is formed with a pin-hole at one end thereof for receiving a pin 144 studded in a front wall plate 143. The other end of the guide 139 is formed with a bent portion 145 which is abutted by the lower end of a screw 147 threaded into a plate 146 secured to the front wall plate 143. A tension spring 148 is extended between and secured to the bent portion 145 and the plate 145, so that rotation of the screw 147 assumes the film focal point guide portion 139 to be pivotally moved about the pin 144 against the force of the spring 148.

Since the back plate 140 serves to restrict the focal plane portion of the film 109 and the guide rollers 141 and 142 serve to restrict the lateral direction with respect to the direction of movement of the film 109, the pivotal movement of the film focal point guide portion 139 effected by the screw serves to vary the relative angle between the scanning direction of the laser beam entering of $f.\theta$ lens 11 and the direction of movement of the film 109.

At the opposite ends of the center portion of the back plate 140, there are provided fine gaps 149 and 150. These fine gaps 149 and 150 each are about 0.1 mm and positioned exactly at right angles with the direction of movement of the film 109. Disposed just behind the fine gaps 149 and 150 are light sensing elements 151 and 152. When, in FIG. 1, the level of the film feeding means 21 is adjusted by means of adjusters A1–A4 and the laser beam scanned by the rotatable mirror 9 is caused to enter the focusing lens 11, the laser beam emerges from the focusing lens 11 to impinge on the surface of the back plate 140, in FIG. 14. By regulating the position of the back plate 140 and the scanning direction of the impinging laser beam by means of the screw 147, the laser beam may be passed through the gaps 149 and 150.

When the laser beam has passed through the gaps 149 and 150, the light sensing elements 151 and 152 respond to the laser beam to put out response signals. By sensing the response signals 151 and 152 by means of suitable means, it can be easily confirmed that the laser beam is entering properly with respect to the direction of movement of the film 109.

The degree of parallelism and the parallelization between the focal point position of the laser beam from the focusing lens 11 and the focal plane film position 140 will hereinafter be described with reference to FIGS. 14 and 15.

Since the focusing lens 11 must have a great reduction rate and a great resolving power, the depth of focus thereof is very small. For example, the focusing lens used with the present invention has a focal length of 30 mm, a spot size of 6 $\mu$m and a depth of focus of $\pm 30$ $\mu$m. Unless the degree of parallelism between the focal point position of the beam and the focal plane film position is at least below the aforementioned depth of focus of $\pm 30$ $\mu$m, recording of the entire image will be impossible.

In the embodiment of the present invention, the parallelization between the focal point position of the beam and the focal plane film position is accomplished by causing the surface reflection at the focal plane position of the film 109 to interfere with the entering laser beam, observing the resulting interference fringes and adjusting the swing and tilting means with respect to the wall plate 143 of a mount plate 153 for the focusing lens 11 such that the number of the interference fringes is minimized.

In FIG. 14, one end of the focusing lens mount plate 153 is attached to the wall plate 143 by means of a spring plate 154 and a pillow plate 155. The other end of the mount plate 153 is provided with screws 156, 157 and 158, of which the screw 156 is threaded into the mount plate 153 and the end of the screw 156 presses the wall plate 143. The other screws 157 and 158 are fitted in holes formed in the mount plate 153, with the ends of these screws being threaded into the wall plate 143. By adjusting the screw 156, the mount plate 153 may be pivotally moved with the spring plate 154 as the pivot. When the aforementioned degree of parallelism has been obtained, the screws 157 and 158 may be threaded in, whereby the mount plate 153 may be secured to the wall plate 143.

Next, the laser beam interference type regulation system will be discussed in connection with FIG. 15.

A beam splitter 201 is disposed on the surface of the plate 18 as the reference board for optical adjustment and between the rotatable mirror 9 and the reflecting optical system 8.

Mirrors 202 and 203 are provided on the reflecting optical path on the entrance side of the beam splitter 201 for the beam from the laser oscillator. A viewing screen 204 is provided on the reflecting optical path on the entrance side of the beam splitter for the reflected beam from the focusing lens 11 side. Adjustment film 12 which, as shown in FIG. 16, comprises a film base 301 and a metal skin 302 of high reflection factor such as aluminum or the like deposited on the film base as by evaporation and to a thickness equal to the recording layer, is mounted to the film feeding means 21. The laser beam from the laser oscillator 2 is reflected as by the reflecting optical systems 6 and 8 and enters the beam splitter 201. Part of the entering beam is separated and reflected by the beam splitter 201 and reflected for deflection by the mirror 202 and further reflected back to the mirror 202 by the mirror 203, and then again reflected for deflection by the mirror 202 so as to pass through the beam splitter 201 to the screen 204. The other part of the entering beam passes through the beam splitter to the rotatable mirror 9 rotating at a fixed velocity, and is reflected thereby to enter the focusing lens 11. The beam from the focusing lens 11 is partly reflected and partly absorbed by the surface of the recording medium 12. The thus reflected light reversely follows the entering optical path to reach the reflecting surface of the beam splitter 201, by which it is reflected to reach the screen 204.

The number of interference fringes provided by the aforementioned reflected light at the film positions 12a and 12b in FIG. 15, which are varied by alternately effecting the parallelization adjustment by the screw 156 and the focusing by rotation of a helical adjust ring 159 provided on the focusing lens 11, is read on the screen 104 so that the number of interference fringes is minimized.

Selection of the film positions 12a and 12b may be achieved by changing the fixed position of the polygonal mirror 9. Also, the positions of the beam splitter 201, mirrors 202, 203 and screw 204 which form the interference optical system are not restricted to between the reflecting optical system 8 and the polygonal mirror 9, but may be anywhere between the focusing lens 11 and the laser oscillator 2. The optical length of the interference optical system should be as great as possible in terms of precision, and a sufficient space necessary therefor is given consideration in the embodiment of the present invention.

In FIG. 14, recorded image presentation means 38 is provided between the rollers 122 and 126. The recording image presentation means comprises a light source 160, a condenser lens 161, a projection lens 162 and a projection screen 163. Since the rollers 122 and 126 are rotated and stopped at predetermined time intervals, the images projected on the screen 163 are stationary at predetermined time intervals.

The film feeding system will now be explained with reference to FIG. 14.

When the leader portion of the recording medium 109 wound on the supply reel 130 is inserted between the rollers 137 and 133, the recording medium 109 is moved in the film feed section by the rollers 133, 136, 122, 126 driven from the motor 112 and by the capstan spindle 107 and the roller 165 driven from the motor 101, whereby the recording medium is automatically taken up by the take-up reel 128.

As seen in FIG. 17, the leader portion of the recording medium extending over a length L is transparent without any recording layer formed therein. When the transparent portion of the recording medium is passing along the surface of the back plate 140, the light sensing elements 151 and 152 are responding to the weak beam from the focusing lens 11 which is not sensed by the recording medium, through the fine gaps 149 and 150, such recording layer portion intercepts the entry of the weak beam into the light sensing elements 151 and 152, so that the outputs of these elements drop. In response to the output drop signals, quick response clutches 105 and 135a are opened while, at the same time, quick response brake 110 is operated, whereby the capstan spindle 107 and the roller 136 are quickly stopped from rotating. Upon opening of these clutches, that portion of the film between the roller 136 and the capstan spindle 107 stops moving, but the other portion of the film still continues to move.

Continued rotation of the supply reel 130 and the roller 133 causes the recording medium 109 to be looped between the rollers 133 and 136. As the leading end of the loop so created approaches an approach sensing element 164, a film approach signal is generated by this approach sensing element 164 and in response to such signal, the clutch 129 is opened to thereby stop the roller 133 and the supply reel 130 from rotating.

Continued rotation of the take-up reel 128 and the rollers 122, 126 creates a tension in the portion of the recording medium 109 between the rollers 126 and 165. Due to the tension so created, part of the recording medium 109 approaches the approach sensing element 166, which thus generates a film approach signal, and in response to such signal, the clutches 121 and 127 are opened to thereby stop the rollers 122, 126 and the take-up reel 128 from rotating.

In accordance with the above-described state, namely, the record ready state of the recording medium within the film feeding means 21 in FIG. 11, the film control circuit 27 generates film feed ready signal Q2.

When all the group of signals including the film feed ready signal have become true, the film control circuit 27 receives film feed enable signal Q1 from the instruction execution circuit. Upon reception of said signal, the film control circuit 27 closes the clutch 105, shown in FIG. 14, and releases the brake 110, so that the capstan spindle 107 resumes rotation to start constant velocity movement of the recording medium 109.

When the portion of the recording medium 109 adjacent to the approach sensing element 164 departs from this element with the film movement by the capstan spindle 107, the approach sensing element 164 generates film supply signal to close the clutch 129, so that the roller 133 and the supply reel 130 are rotated to feed the recording medium 109 again toward the approach sensing element 164 until it approaches the element.

On the other hand, when the portion of the recording medium 109 adjacent to the approach sensing element 166 departs from this element with the film movement on the capstan spindle and approaches another approach sensing element 167, this approach sensing element 167 generates film take-up signal to close the clutches 127 and 121, so that the rollers 122, 126 and the take-up reel 128 are rotated to move the recording medium 109 toward the approach sensing element 166 until it approaches the element.

By varying and adjusting the relative distance between the approach sensing elements 166 and 167, the amount of film movement between the rollers 122 and 126 may be varied and by integrally varying the vertical positions of the approach sensing elements 166 and 167 with respect to the roller 126, it is possible to adjust such that the entire image on each of the aforementioned pages present itself in the opening 168a of a recorded image take-out frame 168.

As has been described above, the film 109 is looped before and behind the capstan spindle 107 and the film focal point position holding section 140, the variation in the loop is sensed by the approach sensing elements 164, 166, 167 and supply and take-up of the film is effected by the sensing signals, so that the variation in load resulting from the supply and take-up of the film is not introduced into the moving performance of the film near the laser beam projection position provided by the capstan spindle, whereby the auxiliary scanning pitch accuracy of the laser beam on the recording surface is enhanced.

Figure 18:
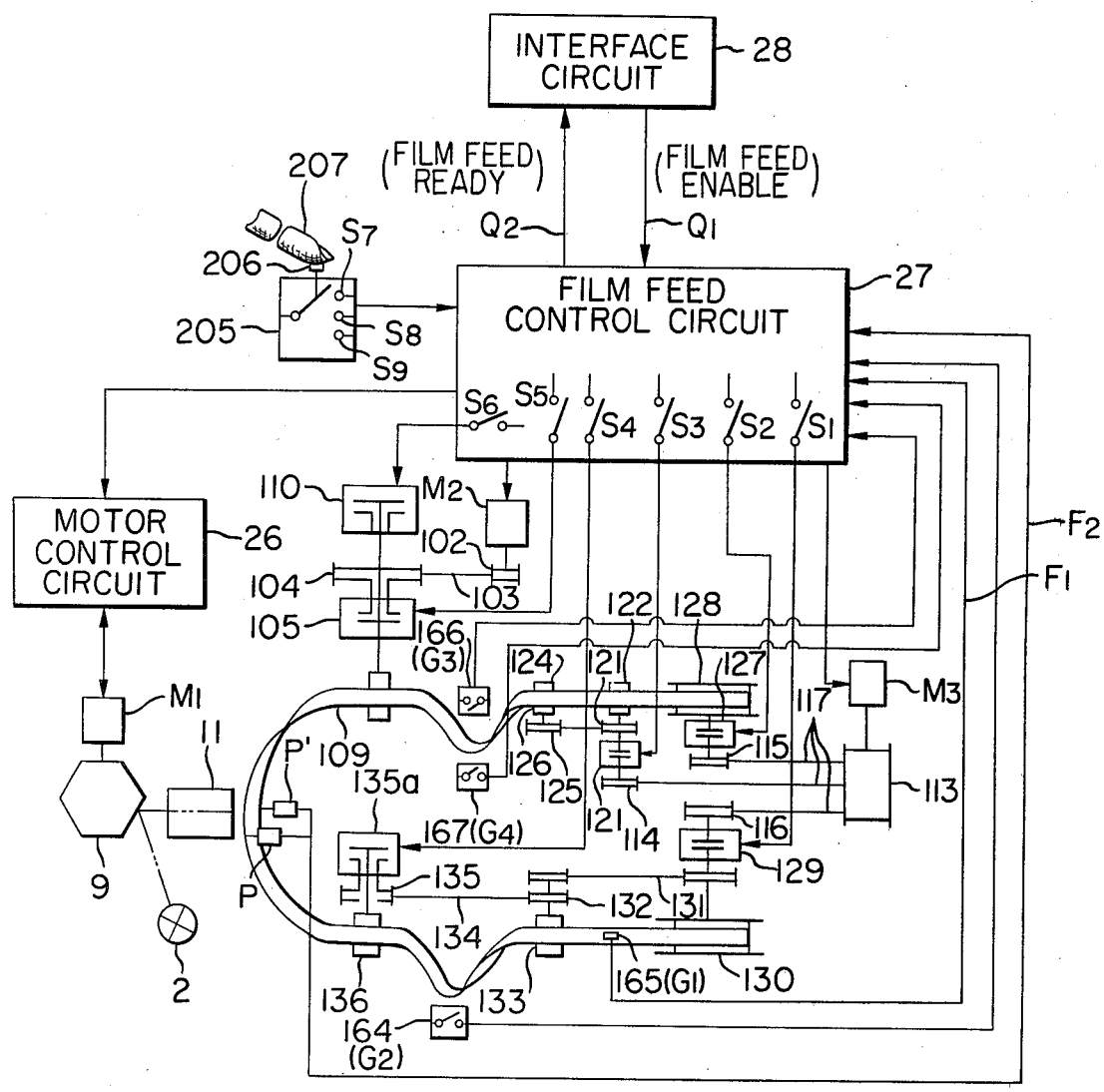
FIG. 18 is a circuit diagram for illustrating the control of the laser recording apparatus.

Reference will now be had to FIGS. 18 and 19 to further describe the inter-clutch relations and the control modes of the intermittent feeding operations by the clutches in the film feeding means as already described.

FIG. 18 is a block diagram abstractly showing the groups of mechanical, electrical and optical elements seen in FIGS. 1 and 14. In FIG. 18, the elements similar to those in FIGS. 1 and 14 are given similar reference characters.

FIG. 19 is a chart in which the modes of the individual elements in the different film feeding modes are represented by symbols 0 and 1. These symbols signify as follows:

For the sensing elements, 1 represents the output generation and 0 the stop of the output.

For the switching elements, 1 represents the closing and 0 the opening.

For the motors, 1 represents rotation, 0 the stop of rotation and −1 the reverse rotation.

For the control signals, 1 represents transmission and 0 the stop of transmission.

The reference characters for the elements and members in FIG. 19 correspond to those in FIG. 18.

There are the following states of film feeding: (1) film loading (automatic); (2) alignment of the record enable portion with the laser beam write-in position, or the so-called head alignment (automatic stop); (3) start of constant velocity film feed in synchronism with image signal (automatic); (4) stop of constant velocity film feed in synchronism with image signal (automatic); (5) manual stop of film movement (manual); (6) manual start of fast forward film movement (manual); and (7) manual start of film rewinding (manual).

In the state (1), when the recording medium 109 approaches the approach sensing element 164 (G1), this element sends film approach signal F1 to the film control circuit 27. In response to the signal F1, the film control circuit 27 controls the states of the clutch control switching means S6, rotatable mirror driving motor 10 (M1), constant velocity film feeding motor 101 (M2) and film transport motor 112 (M3) in the manner as shown in line 2 of FIG. 19, so that the film 19 is supplied from the supply reel 130 and taken up onto the take-up reel 128.

In the state (2), when the movement of the recording medium is being effected by the operative state (1), the light sensing elements 151 (P) and 152 (P') sense the recording layer on the film and these elements P and P' send film movement stop signal F2 to the film control circuit 27. In response to the signal F2, the film control circuit 27 controls the states of the electric and mechanical elements in the manner as shown in line 3 of FIG. 19, so that the movement of the film 109 is stopped.

In the above state, the film control circuit 27 send film feed ready signal Q2 to the controller through the interface circuit 28.

In the state (3), in response to the film feed enable signal Q1 delivered from the controller through the interface circuit 28, the film control circuit 27 controls the states of said elements in the manner as shown in line 4 of FIG. 19, so that the movement of the film 109 starts and continues at the state recording speed.

In the state (4), in response to the stop of the film feed enable signal Q1, the control circuit 27 controls the states of said elements in the manner as shown in line 5 of FIG. 19, so that the movement of the film 109 is stopped.

The film feed enable signal, which is used to designate the movement of the film as already described, is applied to a timer circuit having a time constant of a constant time $\tau$ and this timer circuit detects the lapse of the constant time $\tau$ and causes start of the reading of the recording signals from the first 66 or the second line buffer 67 in FIG. 11.

In other words, in the time $\tau$ after the driving of the film has been started, the modulated beam begins to be projected upon the recording medium.

In this manner, during the while the reading of the recording signals from the first 66 or the second line buffer 67 continues, the constant velocity movement of the film continues, but once a predetermined amount of recording signals, for example, the recording signals corresponding to the information on the two side-by-side pages as shown in FIG. 6, have been read, there is generated a signal for reporting that the predetermined amount of recording signals have been read, so that the reading of the recording signals from the first 66 of the second line buffer 67 is stopped and the generation of the film feed enable signal is also stopped.

Thus, the film feed is stopped at a point of time whereat a predetermined amount of recording has been completed. In such a state, the presence of a predetermined amount of recording signals in the data memory 63 is detected, whereby the film feed enable signal is again generated.

The state (5) is such that the movement or stop of the film has been designated by changing over signal generating switches S7–S9 as desired, by a finger 207 depressing a button 206 provided in manual operation signal generating means 205. When having received the stop signal resulting from the manual operation, the control circuit 27 controls the states of the aforementioned elements in the manner as shown in line 6 of FIG. 19, prior to all other operative states, so that the movement of the recording medium 109 is stopped even in the course of recording thereon. The state (6) is such that fast forward feed has been designated by the switch S8 being closed by the manual operation signal generator 205. When having received such fast forward feed signal, the control circuit 27 controls the states of the aforementioned elements in the manner as shown in line 7 of FIG. 19, prior to all the other operative states. Since the motors M2 and M3 are controlled so that their numbers of revolutions are increased beyond their steady state, the film 109 is quickly taken up on the take-up reel 128.

The state (7) is such that film rewinding has been designated by the switch S9 being closed by the manual operation signal generator 205. When having received the rewinding signal, the control circuit 27 controls the states of the aforementioned elements in the manner as shown in line 8 of FIG. 19, prior to all the other operative states. Since the motors M2 and M3 are controlled so that their rotational directions are reversed, the film 109 is taken up on the supply spool 130.

The rewind designating switch S9 is used to bring the previously recorded image position of the recording medium 109 back to the laser beam projection position when further information is to be added on. Designated by 165 (G1) is a recording medium detection switch which may generate a recording medium presence signal when the recording medium 109 is present near this swith as shown in FIG. 14.

What we claim is:

1. A recording apparatus using coherent light, comprising:
coherent light generating means for generating coherent light;
light modulating means, into which the coherent light from said coherent light generating means enters, for emitting the entered coherent light as zero-order light having a first angle of emergency when said means is in the ON state, and for deriving the coherent light as a primary light having a second angle of emergence when said means is in the OFF state, said modulating means including an intercepting member for intercepting said primary light and preventing its emergency from said modulating means along said second angle of emergence, wherein leak light is produced in said modulating means when it is in the OFF state;
means for applying a modulating signal to said light modulating means for controlling the ON and OFF states of said light modulating means;
a recording medium for recording the coherent light projected thereon; and
deflector means constructed and arranged to deflect the leak light, derived from said light modulating means when in the OFF state, to scan said recording medium in a single direction along a common scanning line but subsequent to, the zero-order light scanning for treating the recording medium.

2. A recording apparatus according to claim 1, wherein said recording medium comprises a heat mode recording medium sensitive to the heat of the coherent light projected thereon.

3. A recording apparatus according to claim 2, wherein said recording medium comprises at least a base layer and a metal layer.

4. A recording apparatus according to claim 1, wherein said coherent light generating means comprises a laser oscillator whose output ranges from 50 mW to 2 W.

5. A recording apparatus according to claim 1, wherein said deflector means comprises mirror rotating means for rotating a mirror to deflect the zero-order light so that the scanning velocity of the light on said recording medium ranges from 10 m/sec. to 200 m/sec.

6. A recording apparatus according to claim 1, further comprising means for removing fine particles scattered from said recording medium as a result of the coherent light being projected upon said recording medium.

7. A recording apparatus using coherent light, comprising:
coherent light generating means for generating coherent light in response to a modulating signal applied thereto;
means for applying the modulating signal to said coherent light generating means;
a recording web for receiving the coherent light generated by said coherent light generating means;
deflecting means for deflecting the coherent light emitted from said coherent light generating means to scan said recording web in its lateral direction;
means for feeding said recording web in its longitudinal direction at a constant speed;
guide means for guiding said recording web along its moving direction;
a plurality of light detecting means, arranged on said guide means and linearly spaced in the direction of the scanning of the coherent light, for checking the scanning angle of the coherent light with respect to said guide means; and
adjusting means for adjusting the angle of said guide means with respect to the direction of the scanning of the coherent light.

8. A recording apparatus according to claim 7, wherein said light detecting means are provided adjacent the back side of said recording web.

9. A recording apparatus according to claim 7, wherein said light detecting means each comprise a light receiving element for detecting the light passing through an aperture in said guide means.

10. A recording apparatus according to claim 7, wherein said recording web comprises a heat mode recording medium sensitive to the heat of the coherent light projected thereon.

11. A recording apparatus according to claim 10, wherein said recording web comprises at least one base layer and a metal layer.

12. A recording apparatus according to claim 7, wherein said coherent light generating means comprises a laser oscillator whose output ranges from 50 mW to 2 W 13. A recording apparatus according to claim 7, wherein said deflector means comprises mirror rotating means for rotating a mirror to deflect the coherent light so that the scanning velocity of the light on said recording web ranges from 10 m/sec. to 200 m/sec.

14. A recording apparatus according to claim 7, further comprising means for removing fine particles scattered from said recording web as a result of the coherent light being projected upon said recording web.

* * * * *

UNITED STATES PATENT AND TRADEMARK OFFICE
CERTIFICATE OF CORRECTION

PATENT NO. : 4,307,408
DATED : December 22, 1981
INVENTOR(S) : TAKEHIKO KIYOHARA, ET AL.

It is certified that error appears in the above—identified patent and that said Letters Patent is hereby corrected as shown below:

Column 21

Line 40, change "esntiy" to --density--.

Column 23

Line 19, change "of", first occurrence, to --the--.

Signed and Sealed this

Fifteenth Day of June 1982

[SEAL]

Attest:

GERALD J. MOSSINGHOFF

Attesting Officer     Commissioner of Patents and Trademarks